(12) United States Patent
Kaida

(10) Patent No.: US 12,342,068 B2
(45) Date of Patent: Jun. 24, 2025

(54) INFORMATION PROCESSING APPARATUS THAT NOTIFIES SUBJECT BLUR, IMAGE CAPTURING APPARATUS, INFORMATION PROCESSING METHOD, AND CONTROL METHOD

(71) Applicant: CANON KABUSHIKI KAISHA, Tokyo (JP)

(72) Inventor: Hironori Kaida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/832,355

(22) Filed: Jun. 3, 2022

(65) Prior Publication Data
US 2022/0394174 A1    Dec. 8, 2022

(30) Foreign Application Priority Data

Jun. 4, 2021 (JP) .................................. 2021-094492
Apr. 18, 2022 (JP) .................................. 2022-068183

(51) Int. Cl.
*H04N 23/60* (2023.01)
*H04N 23/63* (2023.01)
(Continued)

(52) U.S. Cl.
CPC ........... *H04N 23/64* (2023.01); *H04N 23/633* (2023.01); *H04N 23/6811* (2023.01); *H04N 23/951* (2023.01)

(58) Field of Classification Search
CPC .. H04N 23/64; H04N 23/633; H04N 23/6811; H04N 23/951; H04N 23/6812;
(Continued)

(56) References Cited

U.S. PATENT DOCUMENTS

2004/0218914 A1* 11/2004 Sato .................. G03B 17/00
                                                    396/52
2006/0192782 A1* 8/2006 Hildreth ............... G06F 3/0425
                                                    345/473
(Continued)

FOREIGN PATENT DOCUMENTS

CN        111385471 A    7/2020
JP       2004096392 A    3/2004
(Continued)

*Primary Examiner* — Usman A Khan
(74) *Attorney, Agent, or Firm* — Canon U.S.A., Inc. IP Division

(57) ABSTRACT

An information processing apparatus includes an acquisition unit configured to acquire a plurality of first captured images captured by first image capturing using a first image capturing parameter and to acquire motion information about a subject in the plurality of first captured images, an estimation unit configured to estimate a motion blur of the subject in a second captured image captured by second image capturing based on a second image capturing parameter for the second image capturing to be performed using the second image capturing parameter, a setting unit configured to set the first image capturing parameter and the second image capturing parameter. The acquisition unit acquires the motion information from the plurality of first captured images captured using the first image capturing parameter changed so that the changed first image capturing parameter corresponds to an exposure time for the second image capturing relating to the second image capturing parameter.

17 Claims, 14 Drawing Sheets

(51) Int. Cl.
*H04N 23/68* (2023.01)
*H04N 23/951* (2023.01)

(58) Field of Classification Search
CPC ...... H04N 23/73; H04N 23/682; G03B 17/18;
G06T 7/20; G06T 7/80
USPC ...................................................... 348/208.1
See application file for complete search history.

(56) References Cited

U.S. PATENT DOCUMENTS

| | | | |
|---|---|---|---|
| 2007/0230931 A1* | 10/2007 | Nomura | H04N 23/64 396/55 |
| 2013/0201367 A1* | 8/2013 | Endo | H04N 19/176 375/240.12 |
| 2013/0258122 A1* | 10/2013 | Keane | H04N 23/6812 348/208.4 |
| 2013/0336527 A1* | 12/2013 | Nechyba | H04N 23/64 382/103 |
| 2015/0146953 A1* | 5/2015 | Takahashi | G06T 11/60 382/131 |
| 2019/0253630 A1* | 8/2019 | Kojima | H04N 23/62 |
| 2020/0145583 A1* | 5/2020 | Shanmugam | G06T 11/60 |
| 2020/0213482 A1 | 7/2020 | Kobayashi | |
| 2020/0213497 A1 | 7/2020 | Kubo | |
| 2020/0213511 A1* | 7/2020 | Suzuki | H04N 23/634 |
| 2020/0213528 A1 | 7/2020 | Yamaguchi | |

FOREIGN PATENT DOCUMENTS

| | | | |
|---|---|---|---|
| JP | 2008172667 A | 7/2008 | |
| JP | 2013187891 A | 9/2013 | |

\* cited by examiner

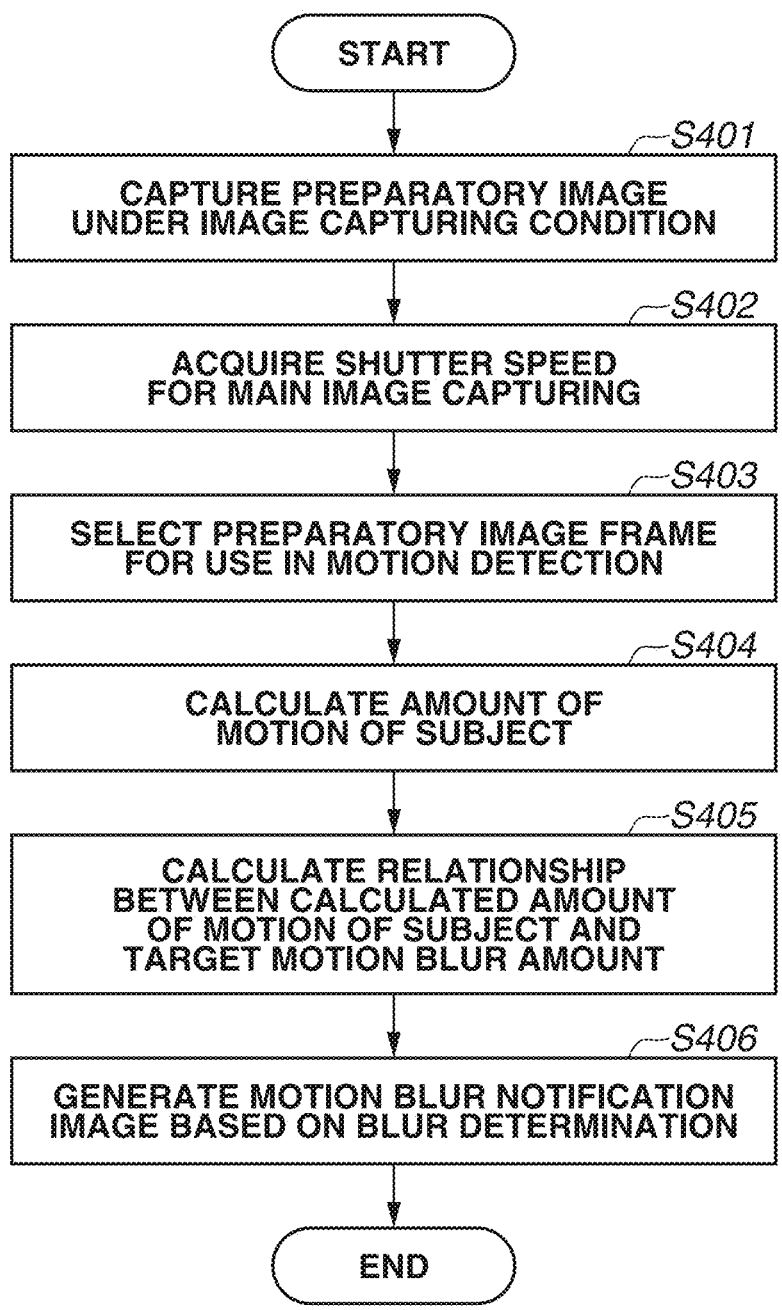

PREPARATORY IMAGE

MOTION VECTOR

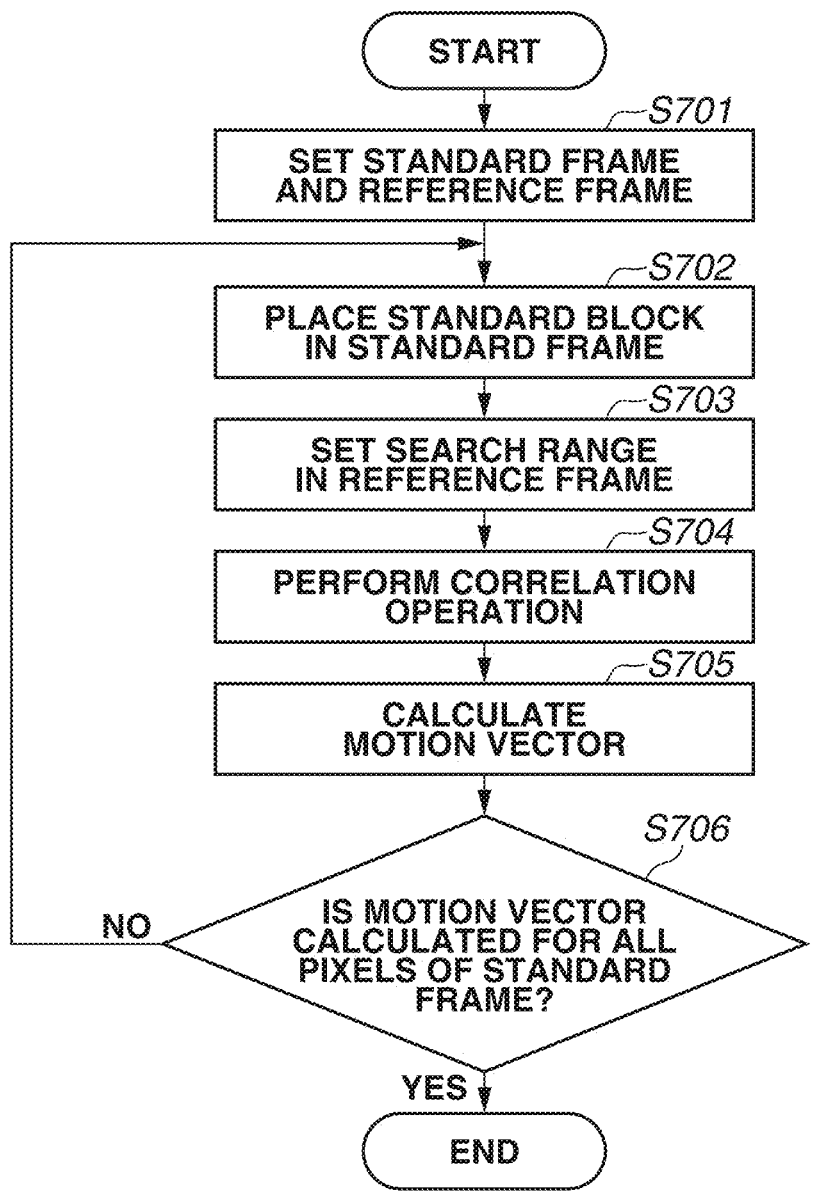

MOTION BLUR
NOTIFICATION ICON

MOTION BLUR
NOTIFICATION BOX

MOTION BLUR
NOTIFICATION EDGE

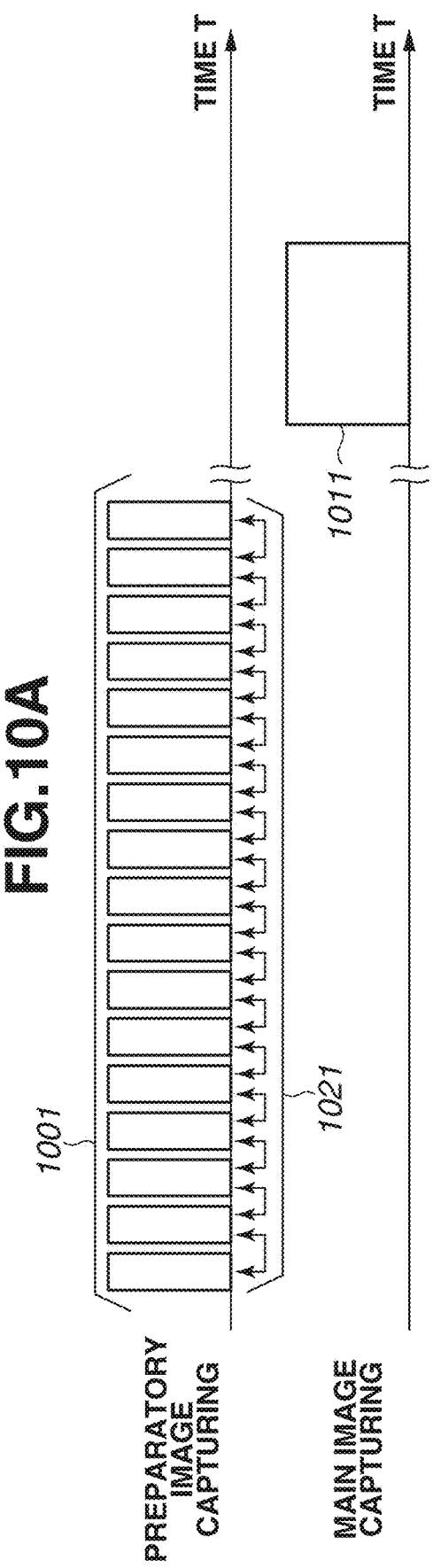
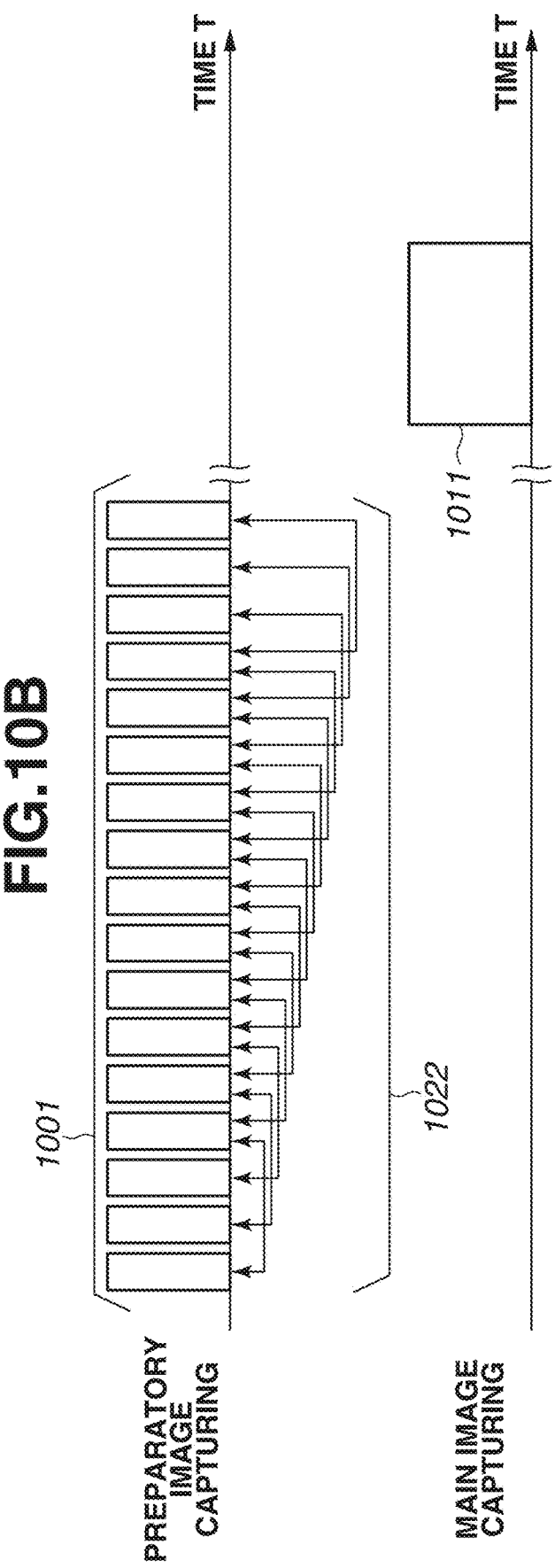

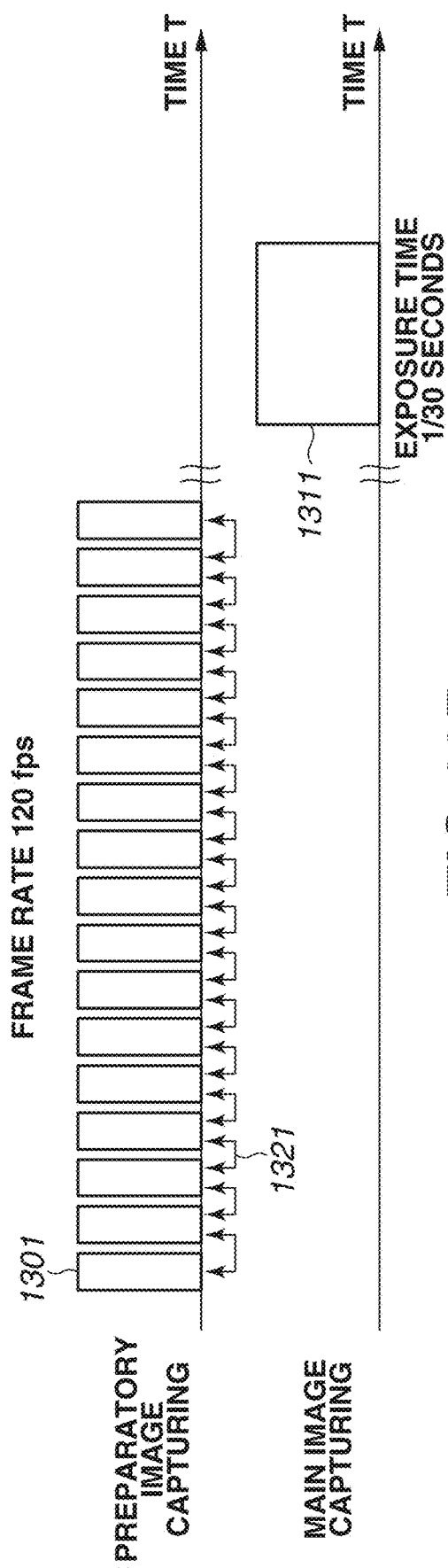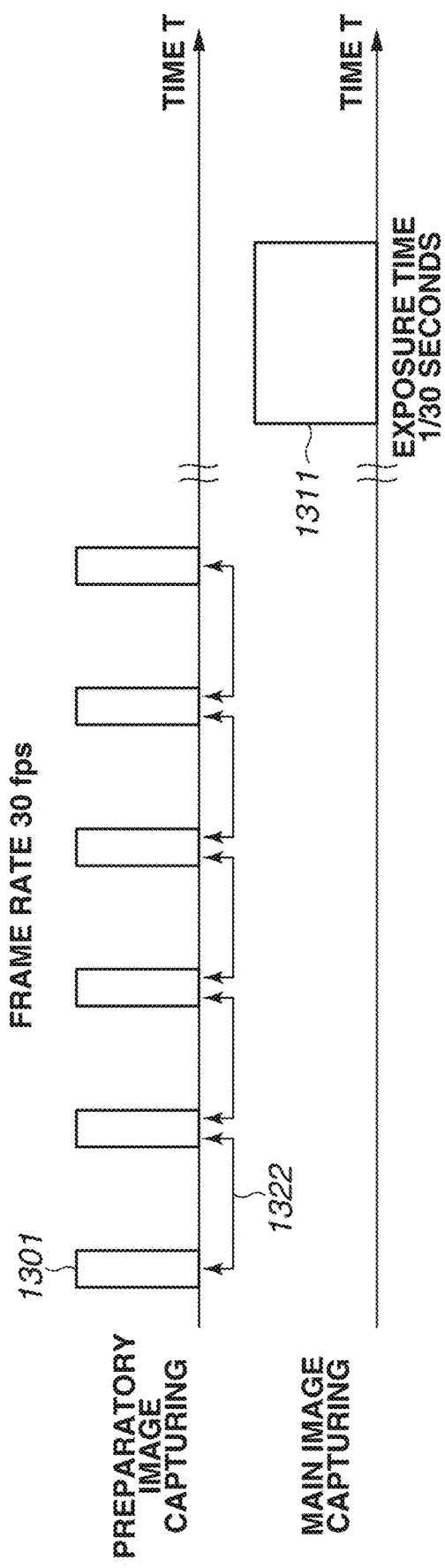

INFORMATION PROCESSING APPARATUS THAT NOTIFIES SUBJECT BLUR, IMAGE CAPTURING APPARATUS, INFORMATION PROCESSING METHOD, AND CONTROL METHOD

BACKGROUND OF THE INVENTION

Field of the Invention

The present invention relates to a technology for notifying subject blurs in captured images.

Description of the Related Art

There are image capturing apparatuses such as digital still cameras with an image capturing mode that prioritizes shutter speed. In the image capturing mode, a user sets a desired shutter speed, and the image capturing apparatus automatically sets exposure setting values other than the shutter speed, such as an aperture value and an International Organization for Standardization (ISO) sensitivity. Using the mode, for example, the user can set a high shutter speed before image capturing to capture images with less motion blur.

Japanese Patent Application Laid-Open No. 2008-172667 discusses a technology for detecting motion regions from among time-series images captured during preparatory image capturing and highlighting the motion regions. Preparatory image capturing herein refers to image capturing that is performed before main image capturing to set a composition and image capturing conditions while viewing an electronic viewfinder or rear liquid crystal display of an image capturing apparatus. Further, main image capturing refers to image capturing that is triggered by the press of a shutter button by a user and is performed by an image capturing apparatus based on a composition and image capturing conditions that are set in preparatory image capturing.

Japanese Patent Application Laid-Open No. 2008-172667, however, is silent on image capturing at an appropriate frame rate and an appropriate shutter speed for the speed of a subject and for the amount of movement of the subject in order to extract motion regions from among time-series images. For example, capturing portrait images at night leads to long exposure time because the image capturing apparatus collects a less quantity of light than that in the daytime. Thus, a slight shake or motion of a person can cause a subject blur. However, an appropriate frame rate value is not always previously set to detect a slight motion of a subject, which raises an issue that an appropriate notification of an occurrence of a subject blur is not provided to the user.

SUMMARY OF THE INVENTION

According to an aspect of the present invention, an information processing apparatus includes an acquisition unit configured to acquire a plurality of first captured images captured by first image capturing using a first image capturing parameter, and to acquire motion information about a subject in the plurality of first captured images, an estimation unit configured to estimate a motion blur of the subject in a second captured image captured by second image capturing based on the motion information and a second image capturing parameter set independently of the first image capturing parameter for the second image capturing to be performed using the second image capturing parameter, a setting unit configured to set the first image capturing parameter and the second image capturing parameter, and a notification unit configured to notify information about the motion blur. The acquisition unit acquires the motion information from the plurality of first captured images captured using the first image capturing parameter changed so that the changed first image capturing parameter corresponds to an exposure time for the second image capturing relating to the second image capturing parameter.

According to another aspect of the present invention, an information processing apparatus includes an acquisition unit configured to acquire a plurality of first captured images captured by first image capturing using a first image capturing parameter and to acquire motion information about a subject in the plurality of first captured images, an estimation unit configured to estimate a motion blur of the subject in a second captured image captured by second image capturing based on the motion information and a second image capturing parameter set independently of the first image capturing parameter for the second image capturing to be performed using the second image capturing parameter, a setting unit configured to set the first image capturing parameter and the second image capturing parameter, and a notification unit configured to notify information about the motion blur. The acquisition unit selects an image for use in acquiring the motion information from the plurality of first captured images based on an exposure time for the second image capturing relating to the second image capturing parameter.

According to yet another aspect of the present invention, an image capturing apparatus includes an image capturing unit and configured to output, in response to an image capturing instruction issued by a user while the image capturing unit sequentially outputs a plurality of first captured images captured by first image capturing using a first image capturing parameter, a second captured image captured by second image capturing using a second image capturing parameter based on the image capturing instruction. The image capturing apparatus further includes an acquisition unit configured to acquire motion information based on the plurality of first captured images output from the image capturing unit, an estimation unit configured to estimate a motion blur of a subject in the second captured image captured by second image capturing based on the motion information and the second image capturing parameter set independently of the first image capturing parameter for the second image capturing to be performed using the second image capturing parameter, a setting unit configured to set the first image capturing parameter and the second image capturing parameter, and a notification unit configured to notify information about the motion blur. The acquisition unit acquires the motion information from the plurality of first captured images captured using the first image capturing parameter changed so that the changed first image capturing parameter corresponds to an exposure time for the second image capturing relating to the second image capturing parameter.

According to yet another aspect of the present invention, an image capturing apparatus includes an image capturing unit and configured to output, in response to an image capturing instruction issued by a user while the image capturing unit sequentially outputs a plurality of first captured images captured by first image capturing using a first image capturing parameter, a second captured image captured by second image capturing using a second image capturing parameter based on the image capturing instruction. The image capturing apparatus further includes an acquisition unit configured to acquire motion information based on the plurality of first captured images output from the image capturing unit, an estimation unit configured to estimate a motion blur of a subject in the second captured image captured by second image capturing based on the motion information and the second image capturing parameter set independently of the first image capturing parameter for the second image capturing to be performed using the second image capturing parameter, a setting unit configured to set the first image capturing parameter and the second image capturing parameter, and a notification unit configured to notify information about the motion blur. The acquisition unit selects an image for use in acquiring the motion information from the plurality of first captured images based on an exposure time for the second image capturing relating to the second image capturing parameter.

According to yet another aspect of the present invention, an information processing method includes acquiring a plurality of first captured images captured by first image capturing using a first image capturing parameter, and to acquire motion information about a subject in the plurality of first captured images, estimating a motion blur of the subject in a second captured image captured by second image capturing based on the motion information and a second image capturing parameter set independently of the first image capturing parameter for the second image capturing to be performed using the second image capturing parameter, setting the first image capturing parameter and the second image capturing parameter, and notifying information about the motion blur. The motion information is acquired from the plurality of first captured images captured using the first image capturing parameter changed so that the changed first image capturing parameter corresponds to an exposure time for the second image capturing relating to the second image capturing parameter.

According to yet another aspect of the present invention, an information processing method includes acquiring a plurality of first captured images captured by first image capturing using a first image capturing parameter and acquiring motion information about a subject in the plurality of first captured images, estimating a motion blur of the subject in a second captured image captured by second image capturing based on the motion information and a second image capturing parameter set independently of the first image capturing parameter for the second image capturing to be performed using the second image capturing parameter, setting the first image capturing parameter and the second image capturing parameter, and notifying information about the motion blur. An image for use in acquiring the motion information is selected from the plurality of first captured images based on an exposure time for the second image capturing relating to the second image capturing parameter.

According to yet another aspect of the present invention, a method of controlling an image capturing apparatus including an image capturing unit and configured to output, in response to an image capturing instruction issued by a user while the image capturing unit sequentially outputs a plurality of first captured images captured by first image capturing using a first image capturing parameter, a second captured image captured by second image capturing using a second image capturing parameter based on the image capturing instruction, includes acquiring motion information based on the plurality of first captured images output from the image capturing unit, estimating a motion blur of a subject in the second captured image captured by second image capturing based on the motion information and the second image capturing parameter set independently of the first image capturing parameter for the second image capturing to be performed using the second image capturing parameter, setting the first image capturing parameter and the second image capturing parameter, and notifying information about the motion blur. The motion information is acquired from the plurality of first captured images captured using the first image capturing parameter changed so that the changed first image capturing parameter corresponds to an exposure time for the second image capturing relating to the second image capturing parameter.

According to yet another aspect of the present invention, a method of controlling an image capturing apparatus including an image capturing unit and configured to output, in response to an image capturing instruction issued by a user while the image capturing unit sequentially outputs a plurality of first captured images captured by first image capturing using a first image capturing parameter, a second captured image captured by second image capturing using a second image capturing parameter based on the image capturing instruction, includes acquiring motion information based on the plurality of first captured images output from the image capturing unit, estimating a motion blur of a subject in the second captured image captured by second image capturing based on the motion information and the second image capturing parameter set independently of the first image capturing parameter for the second image capturing to be performed using the second image capturing parameter, setting the first image capturing parameter and the second image capturing parameter, and notifying information about the motion blur. An image for use in acquiring the motion information is selected from the plurality of first captured images based on an exposure time for the second image capturing relating to the second image capturing parameter.

Further features of the present invention will become apparent from the following description of embodiments with reference to the attached drawings.

BRIEF DESCRIPTION OF THE DRAWINGS

FIG. 4 is a diagram illustrating a process of step S202 in FIG. 2 according to the first embodiment.

FIG. 7 is a flowchart illustrating a motion vector calculation process.

FIGS. 10A and 10B are timing charts illustrating image acquisition timings in preparatory image capturing and in main image capturing.

FIGS. 13A and 13B are diagrams illustrating frame rate control.

DESCRIPTION OF THE EMBODIMENTS

Some embodiments of the present invention will be described below with reference to the accompanying drawings. Each of the embodiments of the present invention described below can be implemented solely or as a combination of a plurality of the embodiments or features thereof where necessary or where the combination of elements or features from individual embodiments in a single embodiment is beneficial.

According to a first embodiment of the present invention, a motion blur in main image capturing is estimated using motion information calculated based on images during preparatory image capturing, and a motion blur notification image indicating the motion blur estimated to occur in the main image capturing is displayed as a notification to a user.

Figure 1:
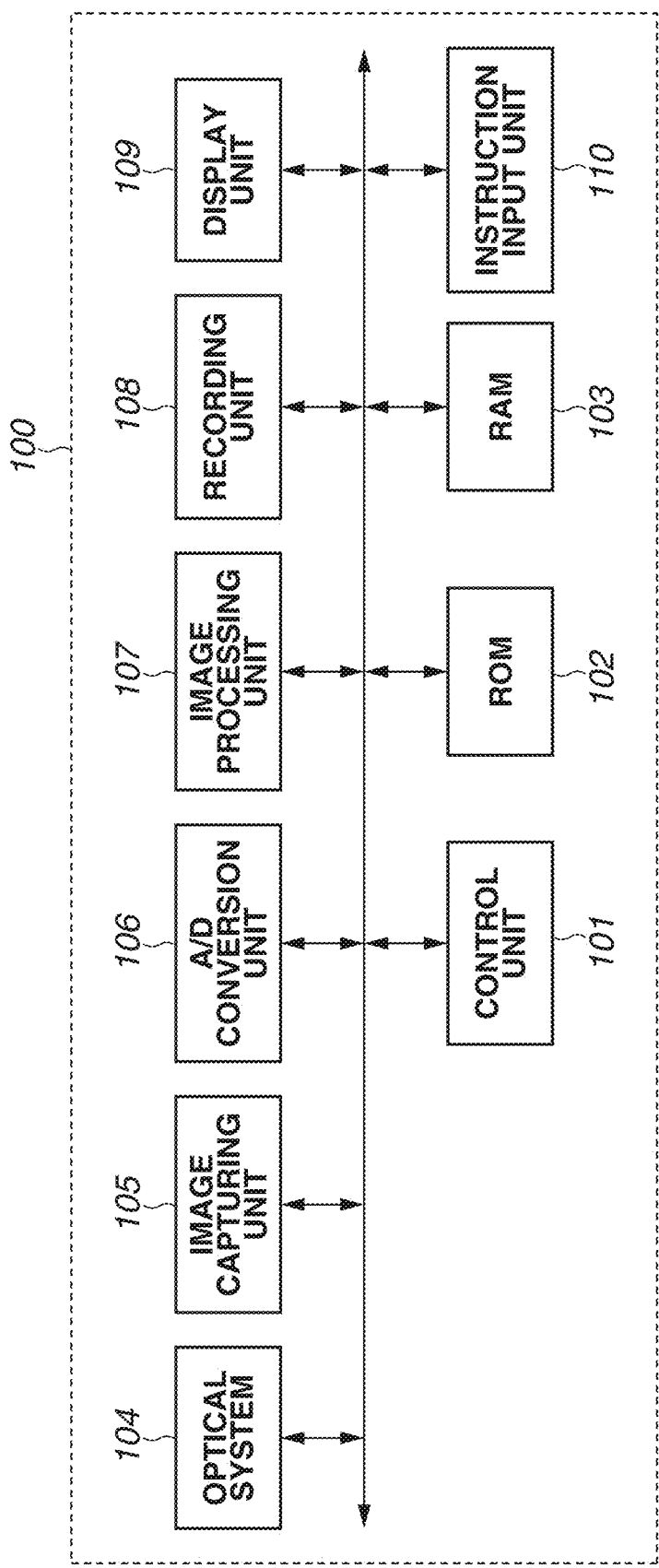
FIG. 1 is a diagram illustrating an example of a configuration of an implementation of the present invention.

FIG. 1 is a block diagram illustrating an example of a configuration according to the first embodiment and illustrates an example of an image capturing apparatus. An example of a configuration according to the first embodiment of the present invention will be described below with reference to FIG. 1.

A control unit 101 is, for example, a central processing unit (CPU). The control unit 101 reads control programs for blocks of an image capturing apparatus 100 (e.g., camera) from a read-only memory (ROM) 102 described below, loads the read control programs to a random access memory (RAM) 103 described below, and runs the loaded control programs, thereby controlling operations of blocks of the image capturing apparatus 100. The ROM 102 is a non-volatile electrically erasable and recordable memory. The ROM 102 stores operation programs for blocks of the image capturing apparatus 100 and parameters for operations of blocks. The RAM 103 is a volatile rewritable memory. The RAM 103 is used to load programs run by the control unit 101 and to temporarily store data generated in operations for blocks of the image capturing apparatus 100.

An optical system 104 includes a lens group provided with a zoom lens and a focus lens and forms a subject image on the imaging surface of an image capturing unit 105. The image capturing unit 105 is an image sensor such as a charge coupled device (CCD) sensor or a complementary metal oxide semiconductor (CMOS) sensor. The image capturing unit 105 photoelectrically converts an optical image formed on the imaging surface of the image capturing unit 105 by the optical system 104 into an analog image signal and outputs the analog image signal to an analog/digital (A/D) conversion unit 106. The A/D conversion unit 106 converts the input analog image signal into digital image data. The digital image data output from the A/D conversion unit 106 is temporarily stored in the RAM 103.

An image processing unit 107 performs various types of image processing, such as white balance adjustment, color interpolation, and gamma processing, on image data stored in the RAM 103. Further, the image processing unit 107 includes a motion blur notification image generation unit 300 described below and generates a motion blur notification image by superimposing an image plane on the image stored in the RAM 103 to facilitate motion blur checking. A recording unit 108 is a recording medium such as a removable memory card. The recording unit 108 records image data processed by the image processing unit 107 as a recorded image via the RAM 103.

A display unit 109 is a display device such as a liquid crystal display (LCD). The display unit 109 displays images stored in the RAM 103, images recorded in the recording unit 108, and an operation user interface for receiving user instructions. Further, the display unit 109 displays an image captured by the image capturing unit 105 for adjusting the composition during the preparatory image capturing. An instruction input unit 110 is a touch panel and a mouse and inputs user instructions.

Figure 2:
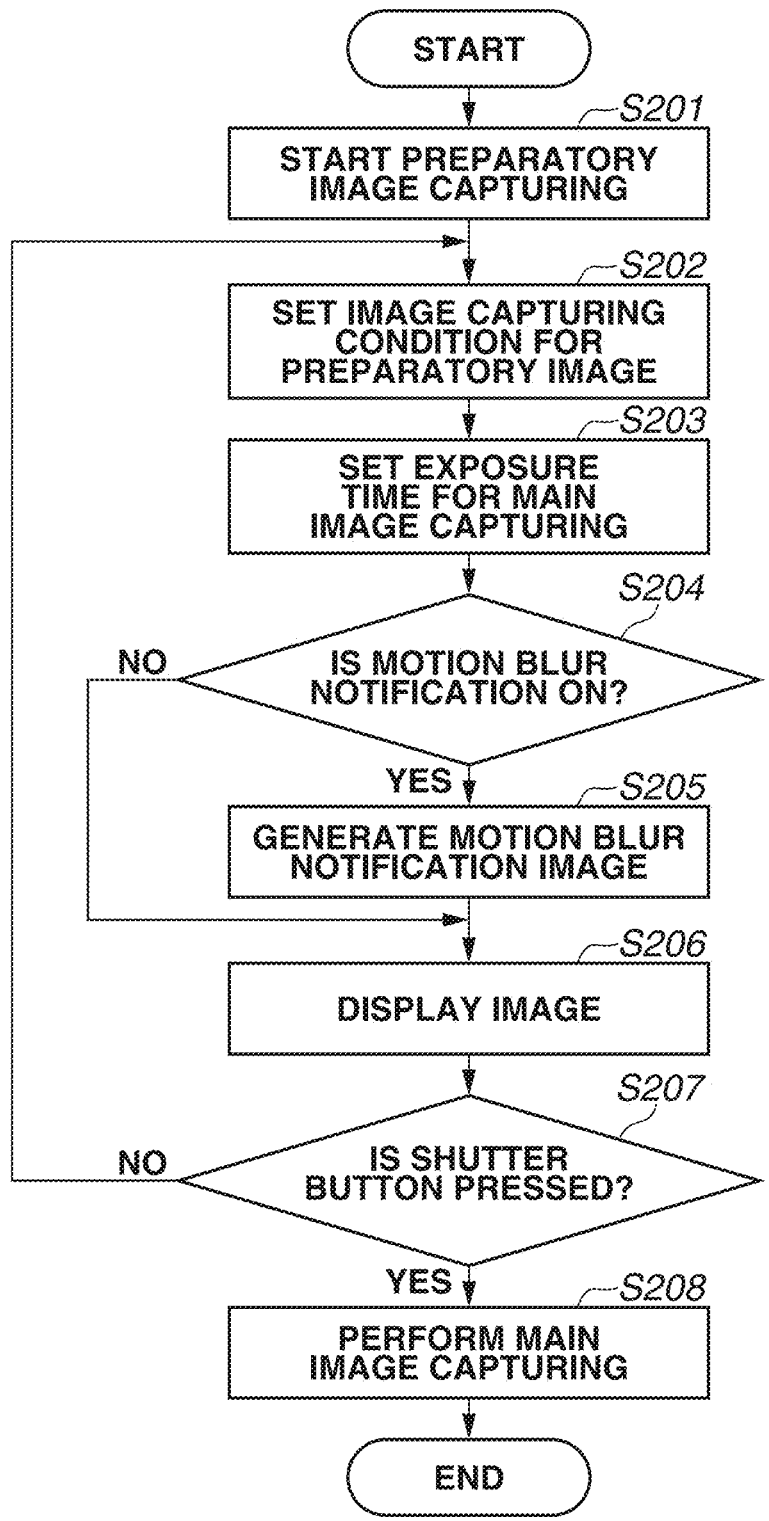
FIG. 2 is a flowchart illustrating a process of image capturing by an image capturing apparatus 100.

Next, the first embodiment will be described in detail below with reference to a flowchart in FIG. 2. A process described below is carried out by the control unit 101 controlling units based on programs stored in the ROM 102. The flowchart in FIG. 2 is implemented in response to when the preparatory image capturing is started.

In step S201, the user turns on the image capturing apparatus 100. Then, in step S201, as the image capturing apparatus 100 is turned on, the control unit 101 controls the optical system 104 and the image capturing unit 105 and starts preparatory image capturing. The control unit 101 maintains a predetermined frame rate during the preparatory image capturing, and the image capturing apparatus 100 sequentially captures images. The acquired captured images are displayed on the display unit 109. The user can adjust the composition while checking the sequentially displayed preparatory images.

In step S202, the image capturing apparatus 100 sets image capturing conditions (image capturing parameters) for preparatory images to be captured for detecting the amount of motion of a subject in the composition. Image capturing conditions herein refer to mainly a frame rate and a shutter speed. A highest frame rate and a high shutter speed are set within a range not to affect a process of calculating an evaluation value for use in general automatic function control performed by an image capturing apparatus, such as auto-exposure (AE) and autofocus (AF) control. Further, the optical system 104 is controlled to make adjustments as appropriate for the shutter speed by changing the lens aperture or the ISO sensitivity setting of the image capturing unit 105 so that images will be captured under an appropriate exposure condition even at the set high shutter speed. The image capturing apparatus 100 performs image capturing under the image capturing conditions set in step S202 during the preparatory image capturing. At higher shutter speeds, a blur of a moving subject is less accumulated in captured images, and the amount of movement of the subject between consecutive captured images decreases. That enables detailed subject motion detection.

In step S203, the user sets image capturing parameters for the main image capturing using the instruction input unit 110. The control unit 101 can set image capturing parameters for the main image capturing independently of the image capturing parameters for the preparatory image capturing based on input from the instruction input unit 110. For example, an exposure time can be set as an image capturing parameter for the main image capturing. Image capturing parameters for the main image capturing can be set automatically by the image capturing apparatus 100. According to the present embodiment, set image capturing parameters for the main image capturing are used as image capturing parameters for the main image capturing after the detection of the press of a shutter button (an instruction to perform main image capturing) described below.

In step S204, the control unit 101 determines whether a motion blur notification setting is set to "ON" or "OFF". The motion blur notification setting is set to "ON" or "OFF" by, for example, the user using the instruction input unit 110, and once the motion blur notification setting is set, the setting value is held. If the control unit 101 determines in step S204 that the motion blur notification is set to "ON" (YES in step S204), in step S205, the motion blur notification image generation unit 300 described below generates a motion blur notification image by superimposing a motion blur notification plane on a preparatory image. Then, in step S206, the control unit 101 displays the generated motion blur notification image on the display unit 109.

On the other hand, if the control unit 101 determines in step S204 that the motion blur notification is set to "OFF" (NO in step S204), no motion blur notification images are generated. Thus, in step S206, a preparatory image without a motion blur notification is displayed on the display unit 109.

In step S207, the control unit 101 determines whether the shutter button of the instruction input unit 110 is pressed by a user operation. For two step inputs to be received, e.g., pressing the shutter button halfway to input an image capturing preparation operation instruction and pressing the shutter button completely to issue a main image capturing instruction, the control unit 101 determines whether the shutter button is pressed completely. For a single input to be received, the control unit 101 determines whether one input is performed.

If the control unit 101 determines that the shutter button is not pressed (NO in step S207), the processing returns to step S202, and steps S202 to S206 are performed again. Thus, during the preparatory image capturing, the user can easily check a motion blur of a subject that is likely to occur in the main image capturing performed using the currently-set image capturing parameters. If the checked motion blur is not a motion blur that the user wants, the user does not press the shutter button to return to step S202, and in step S203, the user can set the shutter speed (exposure time) for the main image capturing again. As described above, the user repeats the process of setting the exposure time for the main image capturing during the preparatory image capturing while checking motion blur notification images displayed on the display unit 109 until a desired motion blur is obtained, and when a chance to capture an image comes, the user presses the shutter button.

In step S207, if the control unit 101 determines that the shutter button is pressed (YES in step S207), the control unit 101 determines that a main image capturing instruction is received, and the processing proceeds to step S208. In step S208, the control unit 101 controls the optical system 104 and the image capturing unit 105 and performs the main image capturing using the image capturing parameters set by the preparatory image capturing. An image captured in the main image capturing is output to the display unit 109 and the recording unit 108 by the control unit 101, and the output image is displayed on a display device of the display unit 109 and is recorded in a recording medium of the recording unit 108 or output to an external device.

Next, an example of a configuration of the motion blur notification image generation unit 300 of the image processing unit 107, which is a feature of the present invention, will be described below with reference to FIG. 3.

Figure 3:
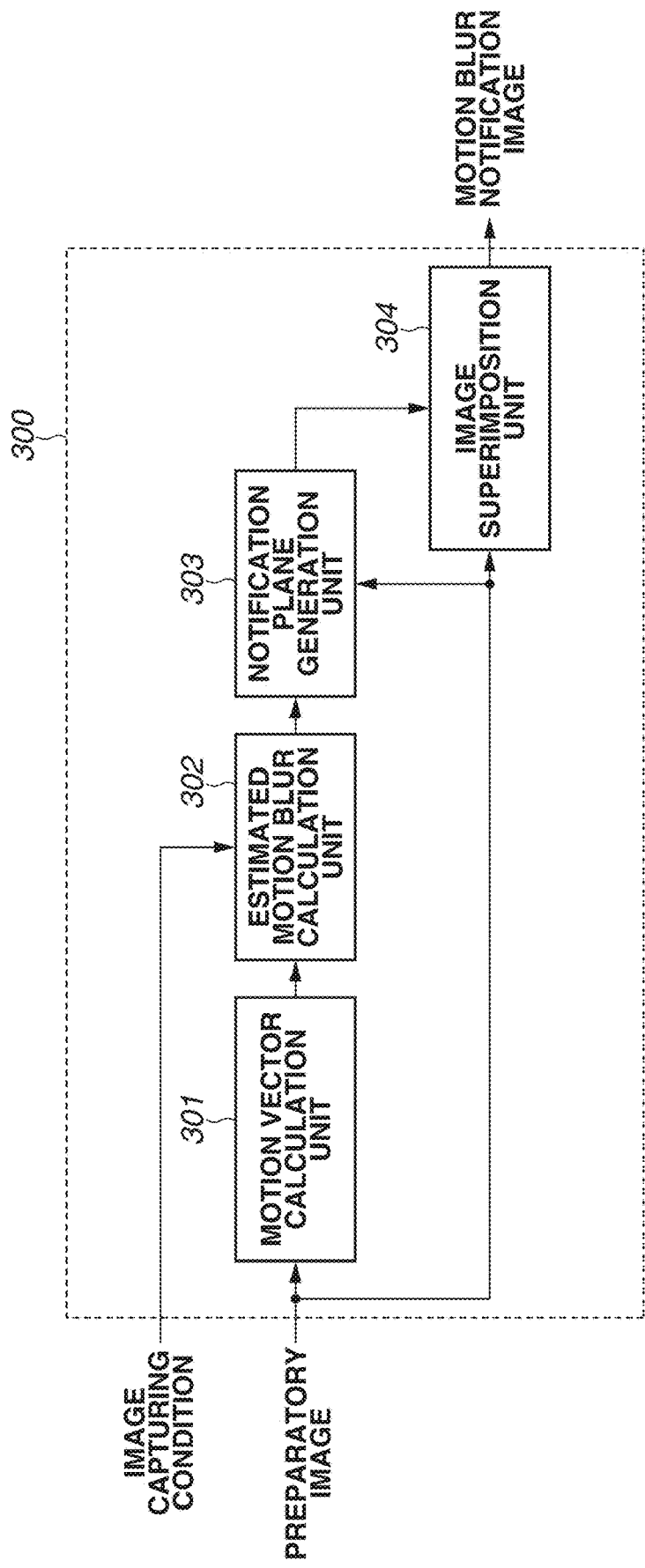
FIG. 3 is a diagram illustrating an example of a configuration of a motion blur notification image generation unit according to a first embodiment.

FIG. 3 is a diagram illustrating an example of a configuration of the motion blur notification image generation unit 300. The motion blur notification image generation unit 300 includes a motion vector calculation unit 301 and an estimated motion blur calculation unit 302. The motion vector calculation unit 301 calculates motion vectors of a subject by comparing images. The estimated motion blur calculation unit 302 estimates a motion blur of the subject in the main image capturing based on the calculated motion vectors. The motion blur notification image generation unit 300 further includes a notification plane generation unit 303 and an image superimposition unit 304. The notification plane generation unit 303 generates data for motion blur notification based on the estimated motion blur of the subject. According to the present embodiment, a motion blur notification plane is superimposed on a captured image, and the image superimposition unit 304 performs the superimposition processing. Details of the operations of the units will be described below.

One or more of the functional blocks illustrated in FIG. 3 can be implemented by hardware such as an application-specific integrated circuit (ASIC) or a programmable logic array (PLA), by a programmable processor such as a CPU or a micro-processing unit (MPU) running software, or by a combination of software and hardware. Thus, different functional blocks described below as operation performers can be implemented by the same hardware as a performer.

Next, the processing of step S205 in FIG. 2 performed by the motion blur notification image generation unit 300 will be described below with reference to a flowchart illustrated in FIG. 4. The steps illustrated in the flowchart are performed by the control unit 101 or units of the image capturing apparatus 100 including the motion blur notification image generation unit 300 based on instructions from the control unit 101.

In step S401, the control unit 101 sets the image capturing conditions set in step S202. Then, the control unit 101 controls the optical system 104 and the image capturing unit 105, and the image capturing apparatus 100 captures consecutive preparatory images for detecting a subject motion blur in the main image capturing.

In step S402, the control unit 101 acquires shutter speed information that is set by the user or is automatically set by the camera for performing the main image capturing.

In step S403, the control unit 101 selects a preparatory image frame for use in subject motion detection (step S404 described below) based on frame rate information for the preparatory image capturing and the shutter speed for the main image capturing. A method of selecting a preparatory image frame will be described in detail below with reference to FIGS. 10A, 10B, and 11.

FIGS. 10A and 10B are timing charts illustrating timings at which frames (1001) are acquired in preparatory image capturing and a timing at which an image (1011) is acquired in main image capturing, with a horizontal axis representing time T.

The horizontal axis represents the time of image capturing. A control 1021 is illustrated in FIG. 10A, and a frame selection 1022 is illustrated in FIG. 10B. The amount of motion of a subject in a moment is calculated using two frames connected by an arrow indicating selected preparatory image frames for use in calculating the amount of motion of the subject. The control 1021 indicates the control of selecting two previous and subsequent frames in performing motion detection, and the frame selection 1022 indicates an example of the preparatory image frame selection based on the frame rate information used in the preparatory image capturing according to the present embodiment and the shutter speed for the main image capturing. The captured image frame selection 1022 indicates a method that is performed generally in calculating the amount of motion of a subject, and according to the present embodiment, captured image frames are selected as indicated by the frame selection 1022.

A method of selecting preparatory image frames according to the present embodiment will be described below with reference to FIG. 11.

Figure 11:
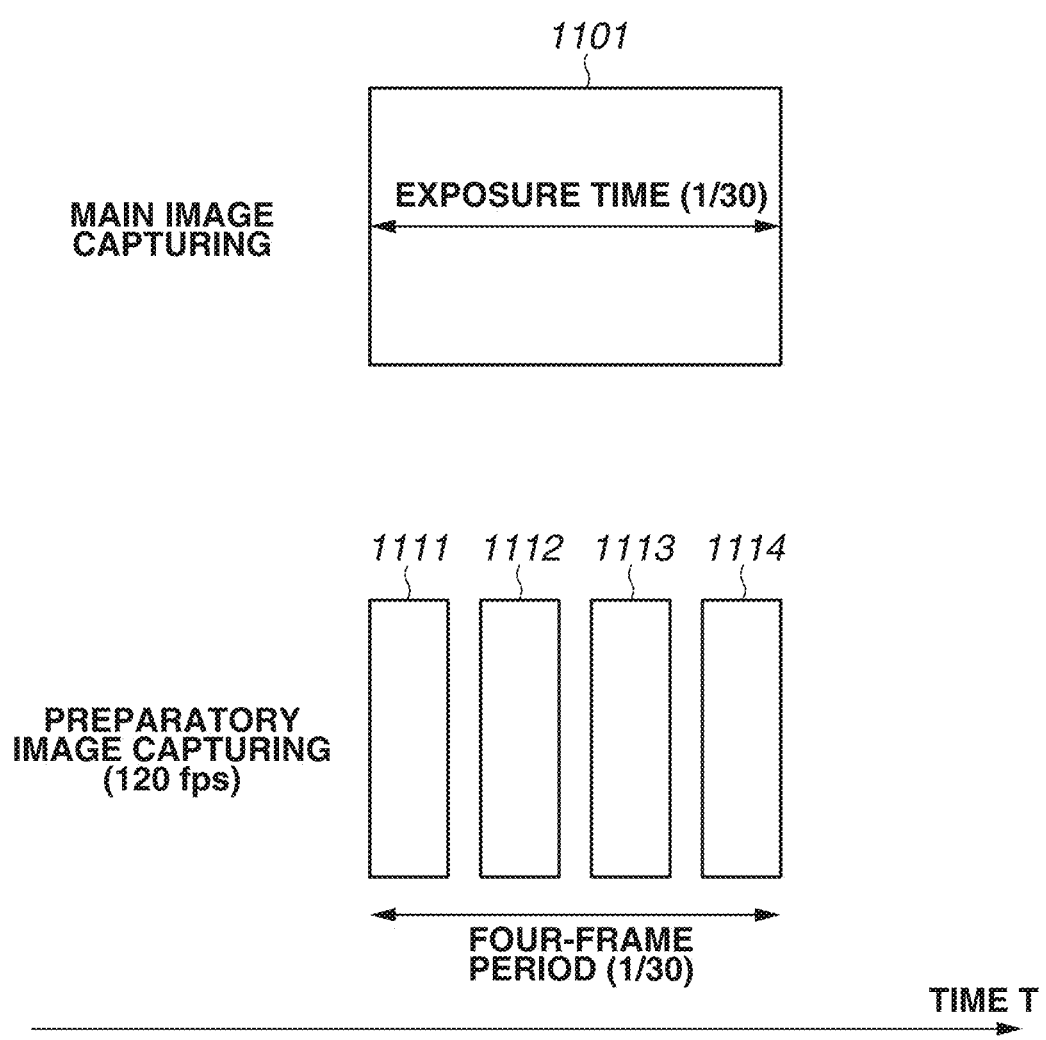
FIG. 11 is a diagram illustrating an exposure time in the main image capturing and a frame period in the preparatory image capturing.

FIG. 11 is a diagram illustrating a relationship between a frame period of a plurality of preparatory images (1111 to 1114) and an exposure time of an image (1101) captured in the main image capturing at the shutter speed for the main image capturing. Specific numerical values will be used in the following description. If the shutter speed for the main image capturing is set to 1/30, an image is captured at an exposure time of 1/30 seconds in the main image capturing. Specifically, with a slight subject motion during the 1/30 seconds, an image with a less accumulated blur is acquired. Meanwhile, preparatory images are captured at a shutter speed so that an accumulated blur is less likely to occur between frames as the preparatory images are for use in motion analysis. For example, a plurality of frames is captured at a shorter exposure time than 1/120 seconds. The frame rate for the preparatory image capturing in which consecutive image capturing is performed is set to 120 fps (consecutive image capturing in which 120 images are captured in one second). The control unit 101 selects frames of preparatory images for detecting a subject motion during the exposure time for the main image capturing so that the frame period of the preparatory images is close to the exposure time for the main image capturing. Since the adjacent frames of the preparatory images 1111 to 1114 have equal periods, the four-frame period (from 1111 to 1114) is 1/30 seconds, which is the same time as the exposure time for the main image capturing. This indicates that the frames that include a subject motion during the time corresponding to the exposure time for the main image capturing, i.e., 1/30 seconds, are selected. The smaller the difference between the frame period of the selected preparatory image frames and the shutter speed for the main image capturing, the smaller the error during step S405 described below, providing an accurate estimation. Thus, the control unit 101 selects frames of preparatory images so that a frame period of the preparatory images is as close to the shutter speed set for the main image capturing as possible. The control unit 101 therefore selects preparatory images of a frame period that satisfies formula (2) below.

$$F\_Period \text{ (frame period)} \geq \text{(the shutter speed for the main image capturing} \times \text{the frame rate for the preparatory image capturing)} \times \alpha \quad \text{formula (2)}.$$

In formula (2), F_Period is a smallest integer that satisfies the formula, and $\alpha$ is a constant number less than or equal to one.

The control unit 101 selects preparatory image frames for calculating the amount of motion of a subject that satisfy formula (2) so that the selected frames are close to a time period corresponding to the shutter speed set for the main image capturing.

The relationship between the frame period of preparatory images and the shutter speed for the main image capturing has been described above with reference to FIG. 11. According to the present embodiment, the frame period of preparatory images is controlled by the control unit 101 to select the frame of the frame selection 1022 in FIG. 10B as described above. Further, the constant number $\alpha$ in formula (2) is desirably set to smaller numbers at higher ISO sensitivities. Use of the constant number $\alpha$ prevents excessively long frame periods for strict image capturing conditions. For example, with a long shutter speed of the main image capturing and an excessively long frame period of preparatory images, complicated subject motions may be included between the frames, and this can cause a decrease in accuracy of the subject motion detection. Use of different constant numbers a for different shutter speeds for the main image capturing prevents a decrease in accuracy of the subject motion detection.

Figure 6A:
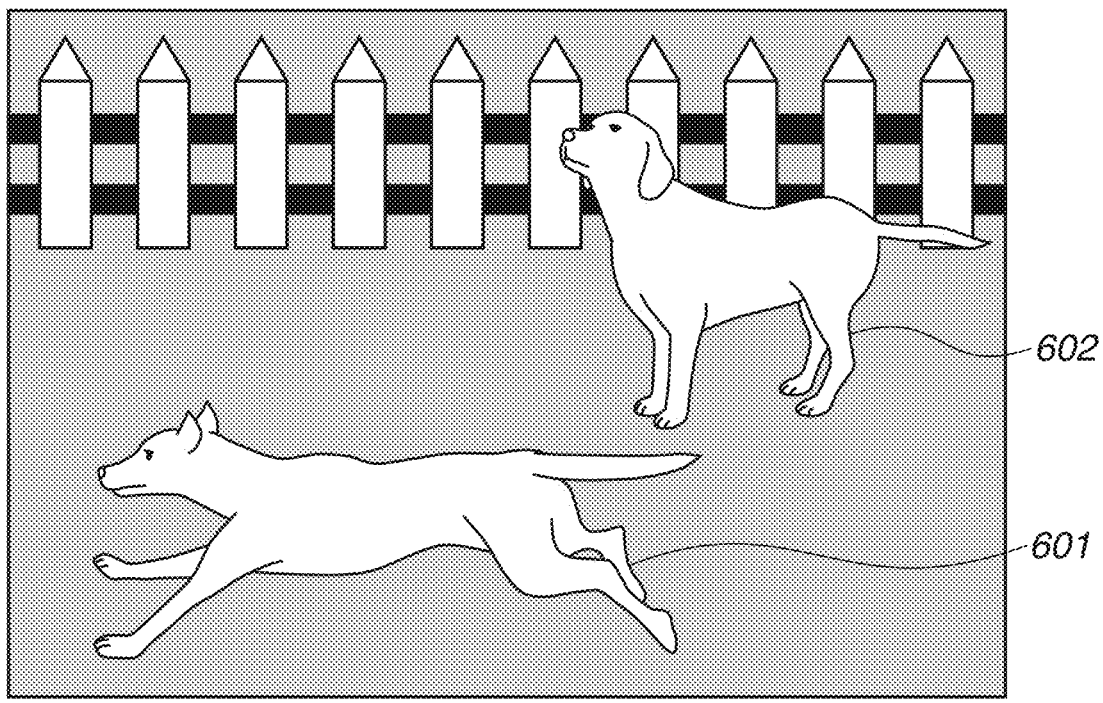
FIGS. 6A and 6B are diagrams illustrating a preparatory image and motion vectors.

In step S404 in FIG. 4, the preparatory image frames selected in step S403 are input to the motion blur notification image generation unit 300, and the motion vector calculation unit 301 calculates the amount of motion of the subject using the input images. The calculation of the amount of motion of the subject by the motion vector calculation unit 301 will be described below with reference to FIG. 6A illustrating a captured image of a scene including a dog 601 running leftward and a still dog 602.

The motion vector calculation unit 301 calculates motion vectors between time-series consecutive preparatory images as the amount of motion of the subject. The motion vectors are vectors representing the amount of horizontal movement of the subject and the amount of vertical movement of the subject between preparatory images. A motion vector calculation method will be described in detail below with reference to FIGS. 7 and 8.

FIG. 7 is a flowchart illustrating a motion vector calculation process. While a block matching method will be described below as an example of a motion vector calculation method according to an aspect of the present invention, the motion vector calculation method is not limited to the example and can be, for example, a gradient method. The steps illustrated in the flowchart are performed by the control unit 101 or units of the image capturing apparatus 100 including the motion blur notification image generation unit 300 based on instructions from the control unit 101.

In step S701, the control unit 101 receives two temporally adjacent preparatory images acquired during the preparatory image capturing and sets a preparatory image of the Mth frame as a standard frame and a preparatory image of the (M+1)th frame as a reference frame.

Figure 8:
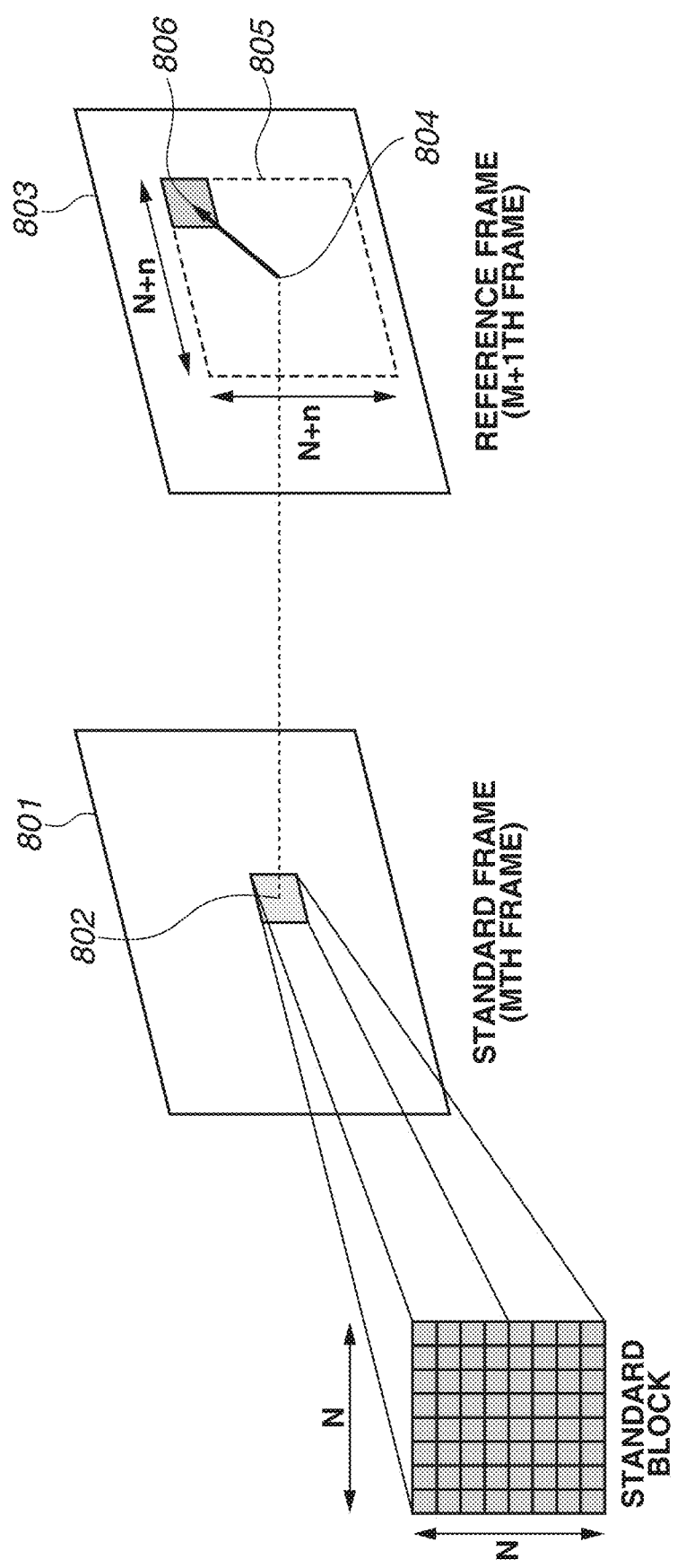
FIG. 8 is a diagram illustrating a motion vector calculation process.

In step S702, the control unit 101 places a standard block 802 of N×N pixels in a standard frame 801 as illustrated in FIG. 8.

In step S703, the control unit 101 sets (N+n)×(N+n) pixels around coordinates 804 corresponding to the coordinates of the center of the standard block 802 in the standard frame 801 as a search range 805 in a reference frame 803 as illustrated in FIG. 8.

In step S704, the control unit 101 performs correlation operation on the standard block 802 in the standard frame 801 and a reference block 806 of N×N pixels at different coordinates within the search range 805 in the reference frame 803 and calculates a correlation value. The correlation value is calculated based on the sum of absolute differences (SAD) between pixels in the standard block 802 and the corresponding pixels in the reference block 806 in the frames 801 and 803. Specifically, coordinates with the least value of the sum of absolute differences between the frames 801 and 803 are coordinates with the highest correlation value. A correlation value calculation method is not limited to the method by calculating a SAD between frames and can be, for example, a method of calculating a correlation value based on the sum of squared differences or a normalized cross correlation value between frames. In the example in FIG. 8, the reference block 806 is indicated as having the highest correlation.

In step S705, the motion vector calculation unit 301 calculates a motion vector based on the coordinates with the highest correlation value calculated in step S704 in the reference block 806. In the example in FIG. 8, a motion vector is calculated based on the coordinates 804 in the search range 805 in the reference frame 803 that correspond to coordinates of the center of the standard block 802 in the standard frame 801 and the coordinates of the center of the reference block 806. Specifically, the distance and direction from the coordinates 804 to the coordinates of the center of the reference block 806 are calculated as a motion vector.

Figure 6B:
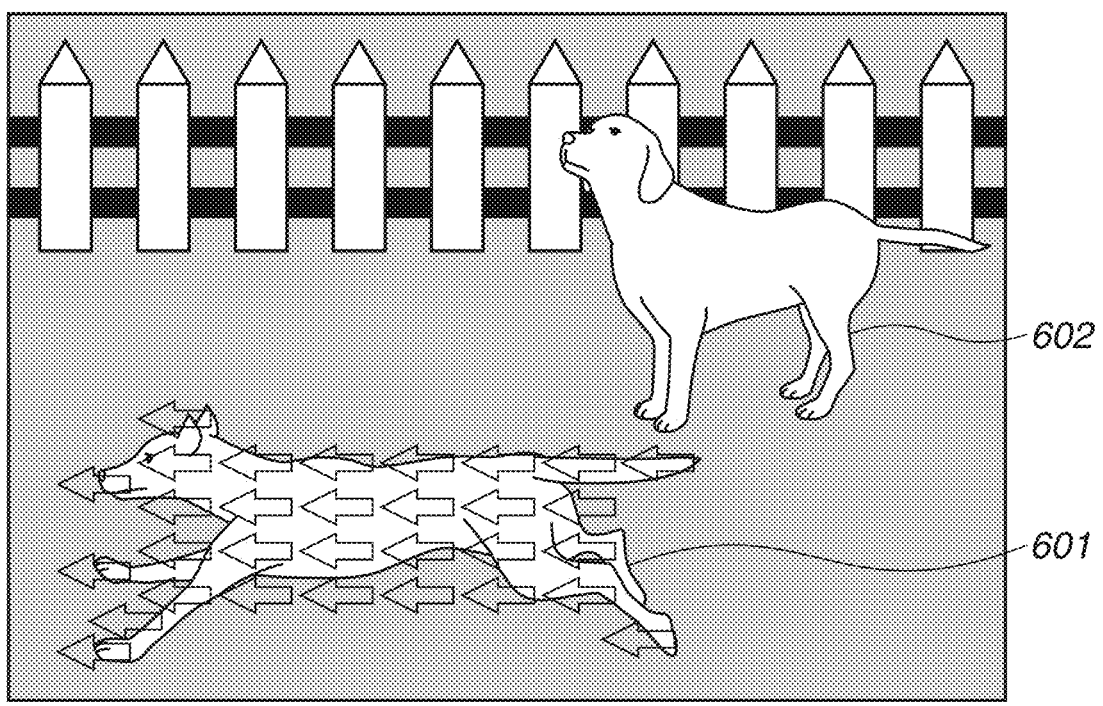

In step S706, the motion vector calculation unit 301 determines whether a motion vector is calculated for all the pixels of the standard frame 801. In step S706, if the motion vector calculation unit 301 determines that a motion vector is not calculated for all the pixels (NO in step S706), the processing returns to step S702. Then, in step S702, the standard block 802 of N×N pixels is placed in the standard frame 801 with its center at a pixel for which a motion vector is not calculated, and steps S703 to S705 are performed as described above. Specifically, the motion vector calculation unit 301 calculates a motion vector for all the pixels in the standard frame 801 by repeating steps S702 to S705 while moving the standard block 802 in FIG. 8. An example of the motion vectors is illustrated in FIG. 6B. FIG. 6B is a diagram illustrating an example of motion vectors in the preparatory image in FIG. 6A.

The preparatory image in FIG. 6A is an example of the dog 601 running leftward. FIG. 6B illustrates a representative example of motion vectors of a moving subject. In the example in FIG. 6B, the running dog 601 is detected as leftward motion vectors, whereas the rest, such as the still dog 602 and the background stockade, are detected as motion vectors of zero, which are not illustrated.

Further, the motion vector calculation unit 301 can calculate a motion vector for each predetermined pixel instead of calculating a motion vector for all pixels. The motion vectors between the frames of the temporally adjacent preparatory images are calculated by the above-described process.

In step S405 in FIG. 4, the estimated motion blur calculation unit 302 calculates a relationship between the calculated amount of motion of the subject and a target amount of motion blur. If the time between the preparatory image frames selected in step S403 does not correspond to the shutter speed (exposure time) for the main image capturing, a subject blur in the main image capturing cannot be calculated accurately. Thus, the amount of motion of the subject that is detected in step S404 is converted by multiplying the amount of motion by a correction gain obtained using formula (4), and a motion blur in the main image capturing is estimated.

$$\text{Correction gain} = \text{the shutter speed for the main image capturing}/\text{the time between the selected preparatory image frames} \quad \text{formula (4)}.$$

Then, the control unit 101 determines whether the motion blur in the main image capturing that is estimated by multiplying the correction gain of formula (4), i.e., estimated motion blur, is greater or less than the target amount of motion blur. The target amount of motion blur herein refers to an allowable amount of motion blur within which a motion blur is not so visible in image capturing performed at a predetermined shutter speed. The allowable amount of motion blur is determined based on the size of an image sensor such as a CCD sensor or a CMOS sensor, the number of pixels, and the resolution of a display device for displaying. For example, under conditions of an advanced photo system type-C (APS-C) image sensor as the image sensor, 200000 pixels as the number of pixels, a full high definition (full HD) (1920×1080 pixels) personal computer (PC) display as the display, and five pixels or less as the allowable amount of motion blur, motions less than or equal to five pixels between frames are to be detected. Specifically, a sufficient resolution for detecting motions less than or equal to the allowable amount of motion blur is provided. A specific example will be described below with reference to FIGS. 5A and 5B.

Figure 5A:
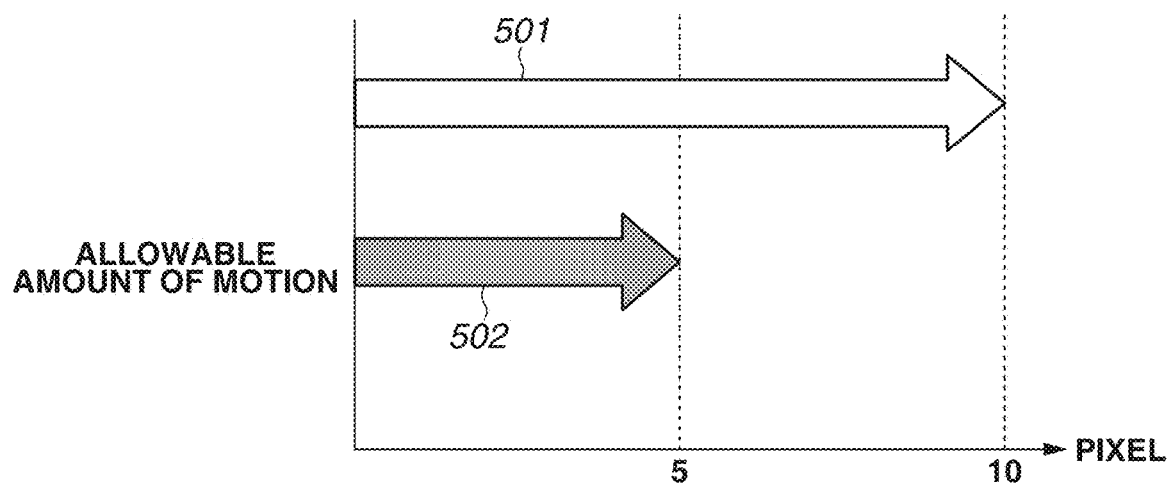
FIGS. 5A and 5B are diagrams illustrating a relationship between an amount of motion of a subject and an allowable amount of motion.
Figure 5B:
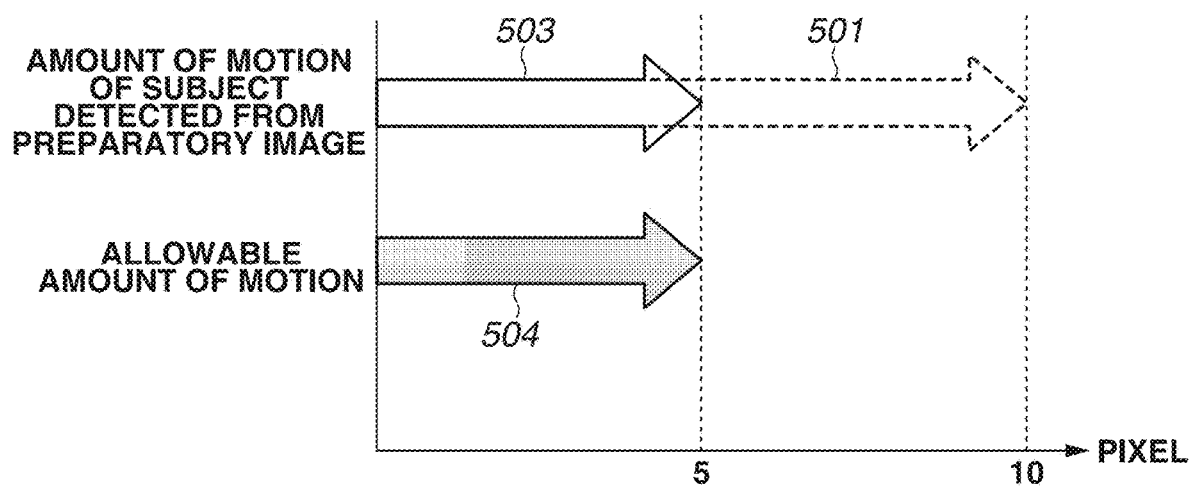

FIGS. 5A and 5B illustrate motion vectors representing a relationship between the amount of motion of a subject that is calculated from preparatory images and the allowable amount of motion blur. FIG. 5A illustrates a case where the amount of motion of a subject that is greater than the allowable amount of motion blur is detected. FIG. 5B illustrates a case where the amount of motion of the subject is less than or equal to an allowable amount of motion. A relationship between the calculated amount of motion of the subject and the target amount of motion blur is expressed by formula (1).

$$n = \text{the amount of motion of the subject}/\text{the allowable amount of motion} \quad \text{formula (1)}.$$

If n is greater than one, the amount of motion of the subject exceeds the allowable amount of motion, so that the control unit 101 determines that a subject blur will occur. On the other hand, if n is less than or equal to one, the control unit 101 determines that the amount of motion of the subject does not exceed the allowable amount of motion. Specifically, the control unit 101 determines that a subject blur will be within the allowable range. A target allowable amount of motion can be determined by a setting set by the user.

Figure 9A:
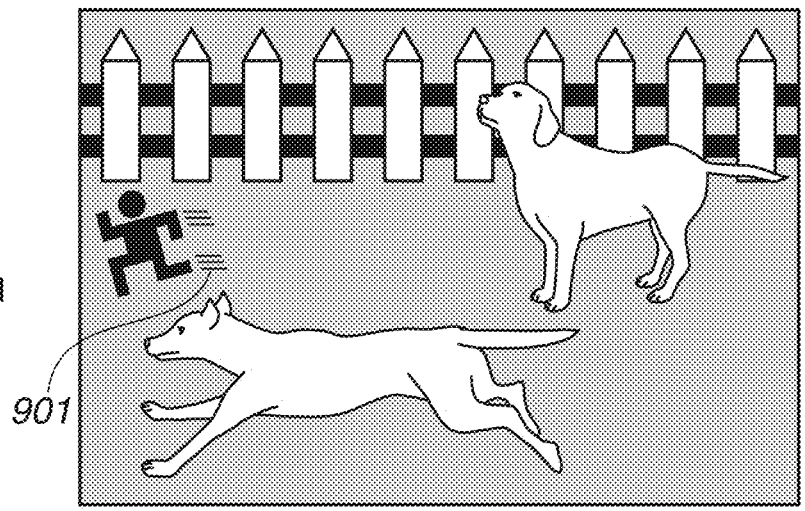
FIGS. 9A to 9C are diagrams illustrating a motion blur notification process.
Figure 9B:
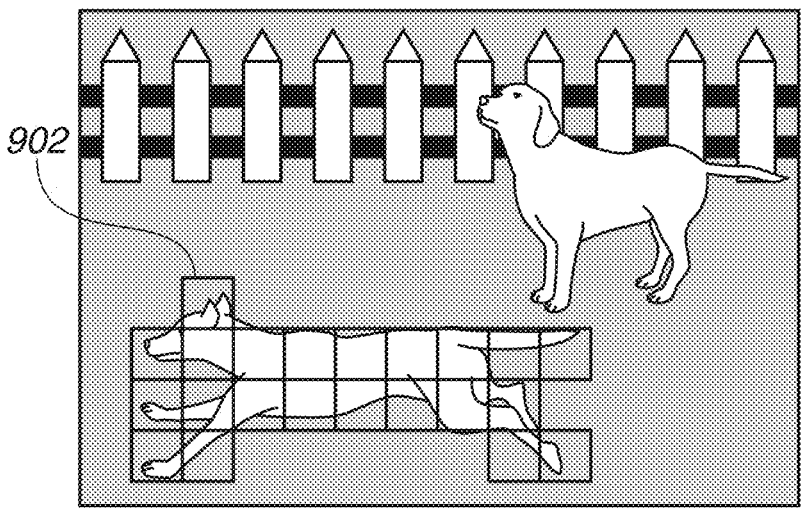
Figure 9C:
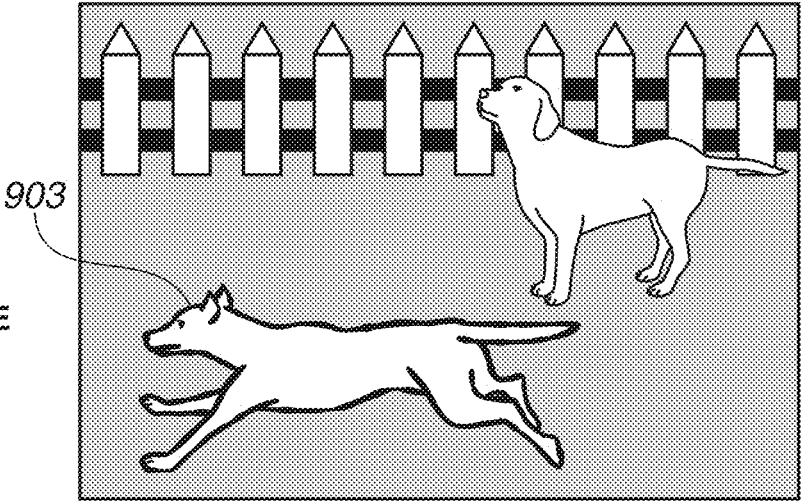

In step S406 in FIG. 4, the motion blur notification image generation unit 300 generates a motion blur notification image from the relationship between the amount of motion of the subject and the target amount of motion blur that is calculated in step S405 based on an instruction from the control unit 101. FIGS. 9A to 9C illustrate motion blur notifications in a process of notifying the user of a motion blur level in performing the main image capturing. Thus, the notification plane generation unit 303 converts the amount of motion that is calculated from the preparatory images into the amount of motion (converted amount of motion blur) that is converted using the exposure condition for the main image capturing, and the notification plane generation unit 303 generates a blur notification image that allows the converted amount of motion to be visually checkable.

First, the notification plane generation unit 303 generates an image plane for motion blur notification for each amount of motion of the subject using the result of formula (1) calculated in step S405. Thereafter, the image superimposition unit 304 superimposes the motion blur notification plane on the preparatory image and generates a motion blur notification image. An example of blur notification images will be described below with reference to FIGS. 9A to 9C.

FIGS. 9A to 9C illustrate three examples of motion blur notification images. The display unit 109 displays a motion blur notification image during the preparatory image capturing so that the user can easily check a motion blur.

First, FIG. 9A illustrates an example of a motion blur notification with an icon display. In step S405, the control unit 101 calculates the proportion of the amounts of motion blur of the subject that produce n greater than one as the result of formula (1) to the entire amount of motion blur of the subject. If the proportion is greater than or equal to a predetermined value, a motion blur icon 901 illustrated in FIG. 9A is generated as a motion blur notification plane, and a motion blur notification image illustrated in FIG. 9A is generated by drawing the motion blur icon 901 on the preparatory image.

FIG. 9B illustrates an example of a motion blur notification with a motion blur box display. A method of generating a motion blur notification image with a motion blur box display will be described. In step S405, the control unit 101 divides the image into regions and calculates the amount of motion blur of the subject in each divided region that produces n greater than one as a result of formula (1). Specifically, the control unit 101 generates a motion blur box 902 illustrated in FIG. 9B as a motion blur notification plane for each divided region with a proportion greater than or equal to the predetermined value, and a motion blur notification image illustrated in FIG. 9B is generated by drawing the motion blur notification plane on the preparatory image.

FIG. 9C illustrates an example of a motion blur notification with a highlighted edge where a motion blur occurs. A method of generating a motion blur notification image by highlighting a motion blur edge will be described. In step S405, the notification plane generation unit 303 detects the edge intensity in the preparatory image. An existing method such as a Sobel filter is used in calculating the edge intensity, and detailed descriptions thereof will be omitted. Then, the notification plane generation unit 303 generates a motion blur notification plane that highlights a motion blur edge 903 as illustrated in FIG. 9C for each region with an edge intensity greater than or equal to a predetermined value and with n in formula (1) that exceeds one, and the notification plane generation unit 303 generates a motion blur notification image illustrated in FIG. 9C by superimposing the motion blur notification plane on the preparatory image. In the example illustrated in FIG. 9C, the motion blur edge 903 is expressed in bold. The motion blur edge is highlighted to enable visual recognition of a motion blur of a small portion of the subject in the main image capturing. Another example for highlighting is in which each pixel with an edge intensity greater than or equal to a predetermined value and with an estimated motion blur greater than or equal to a predetermined value is extracted and the extracted pixels are changed in hue, saturation, and/or brightness, e.g., the extracted pixels are displayed in red.

A process by which the motion blur notification image generation unit 300 generates a motion blur notification image by performing steps S401 to S406 in FIG. 4 has been described above. The process in flowchart in FIG. 2 is performed by the control unit 101 or units of the image capturing apparatus 100 including the motion blur notification image generation unit 300 based on instructions from the control unit 101 leads to an appropriate determination of the image capturing conditions for the preparatory image capturing for checking a motion blur that may occur in the main image capturing.

According to an aspect of the present invention, appropriate preparatory images for checking a motion blur that may occur in the main image capturing are selected and a motion is detected. This makes it possible to check a motion blur that may occur in the main image capturing.

Figure 12:
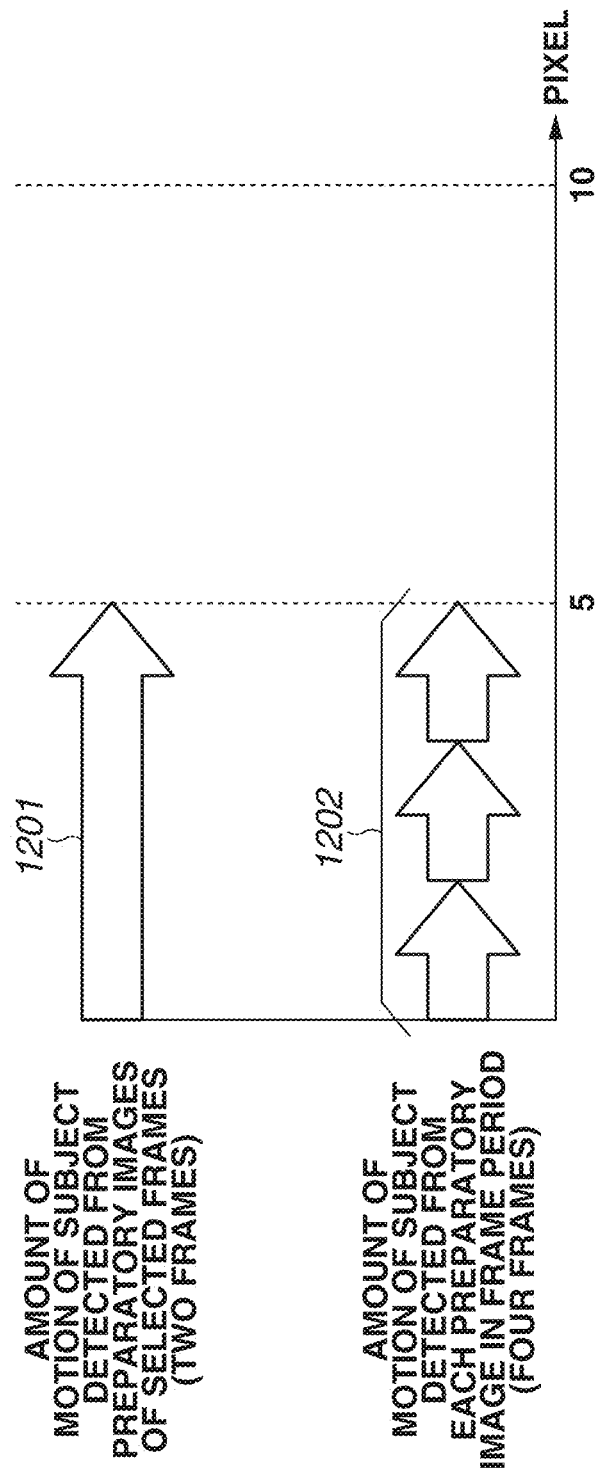
FIG. 12 is a diagram illustrating an integration of amounts of motion in frames.

According to an aspect of the present invention, the above-described control is performed to select frames corresponding to the frame period of preparatory images and to detect the amount of motion in order to estimate the amount of a subject blur that may occur at the exposure time for the main image capturing. For further detailed motion detection, all the preparatory images included in the frame period of preparatory images corresponding to the exposure time for the main image capturing can be used in detecting the amount of motion of the subject. For example, in FIGS. 11 and 12, if the exposure time for the main image capturing is as illustrated in FIG. 11 (1/30 seconds) and the frame rate for the preparatory image capturing is 120 fps as illustrated in FIG. 11, the corresponding period of preparatory images is a period of four frames, which is 1/30 seconds. Thus, according to the first embodiment, the motion vector calculation unit 301 calculates the amount of motion of the subject (the amount of motion 1201 in FIG. 12) using the preparatory images 1111 and 1114 in FIG. 11. The control unit 101 integrates calculated amounts of motion of the subject between the preparatory images 1111 and 1112, between the preparatory images 1112 and 1113, and between the preparatory images 1113 and 1114 (the amount of motion 1202 in FIG. 12). That enables accurate calculation of the motions of the subject during the period of 1/30 seconds from the preparatory image 1111 to the preparatory image 1114 even if the subject moves in a complicated way during 1/30 seconds between the preparatory images (rotational motion, accelerated motion).

Further, if the allowable amount of motion is intentionally undetermined by the user who captures the image, a magnitude of a motion vector within a limit range of motion detection can be set as the allowable amount of motion by the image capturing apparatus 100. In that case, the control unit 101 is to determine whether the motion of the subject exceeds the motion detection range. The determination can be performed based on whether the amount of change in the value of the sum of absolute differences, i.e., SAD, in motion detection is less than a predetermined value or using a method of measuring a motion of the image capturing apparatus 100, such as gyro information. If the control unit 101 determines that the allowable amount of motion is exceeded, the shutter speed and/or the frame rate is controlled to increase.

While the motion blur notification methods in which the display unit 109 displays a motion blur notification according to an aspect of the present invention have been described above as an example, motion blur notification methods are not limited to those described above. For example, sound, light, or vibration can be used as a motion blur notification. Specifically, a motion blur notification sound, a notification light, or a notification vibration is provided if the proportion of the number of pixels with an estimated motion blur greater than or equal to a predetermined value to the entire screen is higher than or equal to a predetermined proportion. According to the present embodiment, the configurations of the notification plane generation unit 303 and the image superimposition unit 304 and the process of steps S405 and S406 are not used. Instead, the image capturing apparatus 100 includes a speaker, and in step S205, the control unit 101 causes the speaker to provide a notification sound, to turn on a notification light, or to provide a notification vibration together with the display of the preparatory image on the display unit 109.

While the control unit 101 selects different frames of preparatory images for motion detection for different shutter speeds for the main image capturing according to an aspect of the present invention, selected frames of preparatory images for motion detection can be changed if the shutter speed for the main image capturing is stable. Controlling frames of preparatory images for motion detection with a stable shutter speed for the main image capturing prevents the display of an unwanted motion blur notification image on the display unit 109 when the user is still determining about the shutter speed control or when the evaluation value calculation by the control unit 101 is unstable.

An example of a method of determining whether a subject motion is stable is as follows. Specifically, after the image capturing conditions for the preparatory image capturing are changed once, whether the subject motion is stable is calculated as a change in motion vectors. If a change in motion vectors per unit time is great, the control unit 101 determines that the subject motion is unstable, and the image capturing conditions for the preparatory image capturing can be changed again.

While the control unit 101 selects different frames of preparatory images for motion detection for different shutter speeds for the main image capturing according to an aspect of the present invention, the shutter speed for the preparatory image capturing can also be changed in addition to the selection of frames from the preparatory image capturing. For example, if the shutter speed for the main image capturing is longer than a predetermined value and the ISO sensitivity for the main image capturing is higher than a predetermined value, the shutter speed for the preparatory image capturing is changed to a longer shutter speed. On the other hand, if the ISO sensitivity for the main image capturing is low, the shutter speed for the preparatory image capturing is changed to a shorter shutter speed. Consequently, the image capturing conditions for the preparatory image capturing for motion detection are traded off against noise effects and accumulated blurs, allowing appropriate preparatory images for motion detection to be captured.

A second embodiment will be described. An example will be described of changing the frame rate for the preparatory image capturing for the shutter speed for the main image capturing to estimate the amount of subject blur in the main image capturing to generate a motion blur notification image according to the present embodiment. According to the present embodiment, that configuration provides an efficient control of the frame rate of preparatory images for notification of a subject blur in the main image capturing.

According to the present embodiment, the configuration of the image capturing apparatus 100 in FIG. 1 according to the first embodiment is used, and redundant descriptions of the block diagram of the image capturing apparatus 100 will be omitted. Further, the entire process performed by the control unit 101 according to the second embodiment is similar to the process illustrated in the flowchart in FIG. 2, and redundant descriptions thereof will be omitted.

Next, the processing of steps S202 and S205 in FIG. 2, which is a feature of the present invention, will be described in detail.

In the processing of step S202, the control unit 101 changes the frame rate for the preparatory image capturing for the shutter speed for the main image capturing. This will be described with reference to FIGS. 13A and 13B.

FIG. 13A is a timing chart illustrating a typical preparatory image capturing and main image capturing. FIG. 13B illustrates an example where the frame rate for the preparatory image capturing is changed for the shutter speed for the main image capturing according to the second embodiment. As an example, the shutter speed for the main image capturing is 1/30 seconds, and the frame rate for the preparatory image capturing in FIG. 13A before the frame rate is changed is 120 fps. As the shutter speed is 1/30 seconds, an image is captured at an exposure time of 1/30 seconds in main image capturing 1311. According to the present embodiment, the control unit 101 changes the frame rate for the preparatory image capturing so that the changed frame rate is close to the exposure time for the main image capturing as illustrated in FIG. 13B. For example, if the frame rate for the preparatory image capturing is 120 fps and the exposure time for the main image capturing is adjusted to 1/30 seconds, the control unit 101 changes the frame rate for the preparatory image capturing to 30 fps. Specifically, the frame rate for the preparatory image capturing is as expressed by formula (3) below.

Changed frame rate for the preparatory image capturing=β/shutter speed for the main image capturing    formula (3).

In formula (3), β is a constant number less than or equal to one.

The constant number β is a predetermined constant number changed based on the ISO sensitivity and the shutter speed for the main image capturing, similarly to the constant number α in formula (2) according to the first embodiment. The control unit 101 changes the frame rate for the preparatory image capturing to satisfy formula (3) so that a frame period is set to enable the appropriate detection of a subject blur at the shutter speed for the main image capturing. FIG. 13B illustrates the changed frame rate, and comparing with the subject motion detection using adjacent frames used in the preparatory image capturing performed using the frame rate illustrated in FIG. 13A, a frame period (1321) in the preparatory image capturing in FIG. 13B is increased and is a time period close to the exposure time for the main image capturing 1311. Thus, a subject motion corresponding to the exposure time for the main image capturing 1311 becomes detectable by controlling the frame rate for the preparatory image capturing as illustrated in FIG. 13B.

Figure 14:
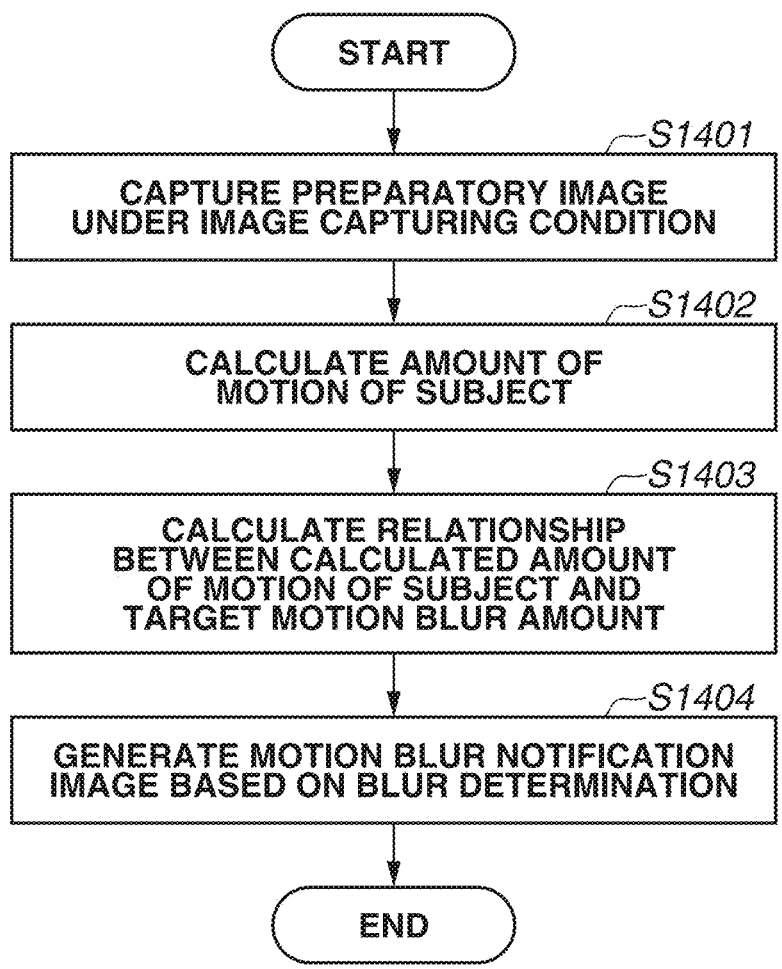
FIG. 14 is a diagram illustrating a process of step S208 in FIG. 2 according to a second embodiment.

The processing of step S205 will be described with reference to a flowchart in FIG. 14. The steps illustrated in the flowchart are performed by the control unit 101 or units of the image capturing apparatus 100 including the motion blur notification image generation unit 300 based on instructions from the control unit 101.

In step S1401, the control unit 101 performs processing similar to step S401 and sets image capturing conditions. Then, the control unit 101 controls the optical system 104 and the image capturing unit 105, and the image capturing apparatus 100 captures consecutive preparatory images.

In step S1402, the control unit 101 performs processing similar to step S402.

In step S1403, the control unit 101 performs processing similar to step S404, and the motion vector calculation unit 301 calculates the amount of motion of the subject from the preparatory images captured in step S1401.

In step S1404, the control unit 101 performs processing similar to step S405, and the estimated motion blur calculation unit 302 calculates a relationship between the calculated amount of motion of the subject and the target amount of motion blur.

In step S205, the control unit 101 performs processing similar to step S406 in FIG. 4. The notification plane generation unit 303 generates an image plane for motion blur notification based on the estimated amount of motion blur in the main image capturing in step S1404, and the image superimposition unit 304 generates a motion blur notification image by superimposing the motion blur notification plane on the preparatory image.

Steps S202 and S205, which are a feature process in the entire process in FIG. 2 controlled by the control unit 101 according to the second embodiment, have been described in detail above.

The configuration according to the second embodiment allows the control unit 101 to control the frame rate for the preparatory image capturing for detecting a subject motion that affects the exposure time for the main image capturing. Thus, motion blurs in the main image capturing motion blur are detected accurately. Further, the configuration without the process of capturing consecutive preparatory images at constantly high frame rate for subject motion detection allows accurate motion detection at reduced power.

According to an aspect of the present invention, the control unit 101 selects different preparatory image frames for motion detection for different shutter speeds for the main image capturing. If the shutter speed for the main image capturing is higher than the maximum value of a frame rate settable by the image capturing apparatus 100, the frame rate for the preparatory image capturing is fixed at the maximum value, and preparatory images closest in the frame period are selected for motion detection. With this condition, practically no motion blurs occur in the main image capturing, so that the motion blur estimation can be omitted. If the shutter speed for the main image capturing is greater than a given value, i.e., the exposure time for the main image capturing is shorter than a given time, the frame rate can be fixed to a specific value.

Further, a threshold value can be set for the shutter speed for the main image capturing, and the control unit 101 can control the frame rate for the preparatory image capturing based on the set value. For example, a first threshold value and a second threshold value greater than the first threshold value are set for the shutter speed for the main image capturing. If the shutter speed for the main image capturing is less than the first threshold value, the control unit 101 performs control using a first frame rate. Further, if the shutter speed for the main image capturing is higher than or equal to the first threshold value and less than the second threshold value, the control unit 101 performs control using a second frame rate. If the shutter speed for the main image capturing is higher than or equal to the second threshold value, the control unit 101 performs control using a third frame rate.

While the example where a motion blur notification is provided if an estimated motion blur is greater than or equal to the predetermined value according to an aspect of the present invention has been described above, the present invention is also applicable to, for example, a case where a plurality of motion blur displays is provided based on the amount of motion. An example is provided with a representation using three colors (red, blue, yellow) based on a magnitude of an estimated motion blur. In that case, the allowable amount of motion is set to enable detection of a narrowest range of the amount of motion so that magnitude ranges of the amount of motion are representable in the colors. For example, if representation colors of a motion blur based on a magnitude of a vector are yellow representing 0 pixels to 10 pixels, blue representing 11 pixels to 15 pixels, and red representing 16 pixels or more, the blue range is the narrowest range of the amount of motion. Specifically, the five pixels (11 to 15) of the blue range are set as the allowable amount of motion.

While the allowable amount of motion blur is set and the frame rate that is an image capturing condition for preparatory images is controlled to enable detection of a motion less than or equal to the allowable amount of motion blur according to an aspect of the present invention, an image capturing condition (sports-prioritized mode) can be changed also if a detected motion blur is less than or equal to a predetermined value.

The image capturing conditions for preparatory images may be also changed if a subject motion in a stable state is detected. Further, whether a motion vector is stable is calculated as a change in motion vector after the image capturing conditions for the preparatory image capturing are changed, and if a change in motion vector per unit time increases, the image capturing conditions for the preparatory image capturing can be changed again.

If the allowable amount of motion is not previously settable, a magnitude of a motion vector within a limit range of motion detection can be set as the allowable amount of motion. In that case, whether a subject motion exceeds the limit range of motion detection is to be determined. Specifically, whether a subject motion exceeds a motion detection range is to be determined. The determination can be performed based on whether the amount of change in the value of the sum of absolute differences (SAD) in motion detection is less than a predetermined value or using a method of measuring the motion of the image capturing apparatus 100, such as gyro information. If the allowable amount of motion is determined as exceeded, the shutter speed and/or the frame rate is controlled to increase.

While the motion blur notification methods in which the display unit 109 displays a motion blur notification according to an aspect of the present invention have been described above as an example, motion blur notification methods are not limited to those described above. For example, sound, light, or vibration can be used as a motion blur notification. Specifically, a motion blur notification sound, a notification light, or a notification vibration may be provided if the proportion of the number of pixels with an estimated motion blur greater than or equal to a predetermined value to the entire screen is higher than or equal to a predetermined proportion.

Other Embodiments

The object of the present invention is also achievable as described below. Specifically, a storage medium that records program codes of software describing a process for carrying out the functions of the embodiments is fed to a system or an apparatus. Then, a computer (or a CPU or a microprocessing unit (MPU)) of the system or the apparatus reads the program codes stored in the storage medium and executes the read program codes.

In that case, the program codes read from the storage medium implements the novel function of the present invention, and the stored medium that stores the program codes and the program are included in the present invention.

Further, examples of storage mediums for feeding program codes include flexible disks, hard disks, optical disks, and magneto-optical disks. Further, compact disk ROMs (CD-ROMs), compact disk recordable (CD-R) disks, compact disk rewritable (CD-RW) disks, digital versatile disk ROM (DVD-ROM) disks, digital versatile disk RAM (DVD-RAM) disks, digital versatile disk rewritable (DVD-RW) disks, digital versatile disk recordable (DVD-R) disks, magnetic tapes, non-volatile memory cards, and ROMs can also be used.

Further, a computer is configured to execute read program codes to carry out the functions of the embodiments. Furthermore, a case is included where an operating system (OS) running on the computer performs actual processing partially or entirely based on instructions of the program codes, the processing of which carries out the functions of the embodiments The following case is also included. First, the program codes read from the storage medium are written to memory of a function expansion board inserted in the computer or a function expansion unit connected with the computer. Thereafter, a CPU on the function expansion board or the function expansion unit performs actual processing partially or entirely based on instructions of the program codes.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Applications No. 2021-094492, filed Jun. 4, 2021, and No. 2022-068183, filed Apr. 18, 2022, which are hereby incorporated by reference herein in their entirety.

What is claimed is:

1. An information processing apparatus comprising:
one or more processors; and
a memory storing instructions which, when executed by the one or more processors, cause the information processing apparatus to function as:
a setting unit configured to set a first image capturing parameter and a second image capturing parameter;
an acquisition unit configured to acquire a plurality of first captured images captured by first image capturing using the first image capturing parameter, and to acquire motion information about a subject in the plurality of first captured images; and
an estimation unit configured to estimate a motion blur of the subject in a second captured image captured by second image capturing based on the motion information and the second image capturing parameter,
wherein the setting unit changes a frame rate, which is included in the first image capturing parameter, based on an exposure time for the second image capturing relating to the second image capturing parameter, for acquiring the plurality of the first captured images.

2. The information processing apparatus according to claim 1, wherein the estimation unit estimates the motion blur using the motion information and the frame rate.

3. The information processing apparatus according to claim 1, wherein a motion blur notification indicating the motion blur estimated to occur in the second image capturing is displayed as a notification to a user.

4. The information processing apparatus according to claim 1, wherein the setting unit changes the frame rate to lengthen an exposure time for the first image capturing, based on the exposure time for the second image capturing.

5. The information processing apparatus according to claim 1, wherein the acquisition unit acquires the motion information from two consecutive time-series images among the plurality of first captured images acquired using the changed frame rate.

6. The information processing apparatus according to claim 1, further comprising a notification unit configured to notify the motion blur by displaying information corresponding to the motion blur on a display unit.

7. The information processing apparatus according to claim 6, wherein the notification unit notifies the motion blur by displaying at least one image, among the plurality of first captured images, on which information corresponding to the motion blur is superimposed on a display unit.

8. The information processing apparatus according to claim 6, wherein, in response to when the estimation unit estimates a greater motion blur than a predetermined value, the notification unit notifies the motion blur.

9. The information processing apparatus according to claim 6, wherein, with a setting of the notification by the notification unit set to off, the notification unit does not notify the motion blur.

10. The information processing apparatus according to claim 1, wherein the first image capturing is preparatory image capturing that captures an image at a time different from the second image capturing.

11. The information processing apparatus according to claim 10, wherein the second image capturing is main image capturing, and the first image capturing is the preparatory image capturing that is performed before the main image capturing.

12. An image capturing apparatus comprising:
an image capturing unit configured to perform first image capturing; and
the information processing apparatus according to claim 1.

13. The information processing apparatus according to claim 1, wherein the setting unit maintains the frame rate for the first image capturing unchanged if the exposure time for the second image capturing is equal to or less than a predetermined time and, if the exposure time for the second image capturing exceeds the predetermined time, the setting unit changes the frame rate for the first image capturing.

14. An image capturing apparatus including an image capturing unit and configured to output, in response to an image capturing instruction issued by a user while the image capturing unit sequentially outputs a plurality of first captured images captured by first image capturing using a first image capturing parameter, a second captured image captured by second image capturing using a second image capturing parameter based on the image capturing instruction, the image capturing apparatus comprising:
one or more processors; and
a memory storing instructions which, when executed by the one or more processors, cause an information processing apparatus to function as:
a setting unit configured to set the first image capturing parameter and the second image capturing parameter;
an acquisition unit configured to acquire motion information based on the plurality of first captured images output from the image capturing unit; and
an estimation unit configured to estimate a motion blur of a subject in the second captured image captured by the second image capturing based on the motion information and the second image capturing parameter,
wherein the setting unit changes a frame rate, which is included in the first image capturing parameter, based on an exposure time for the second image capturing relating to the second image capturing parameter, for acquiring the plurality of first captured images.

15. An information processing method comprising:
setting a first image capturing parameter and a second image capturing parameter
acquiring a plurality of first captured images captured by first image capturing using the first image capturing parameter, and to acquire motion information about a subject in the plurality of first captured images;
estimating a motion blur of the subject in a second captured image captured by second image capturing based on the motion information and the second image capturing parameter, wherein a frame rate, which is included in the first image capturing parameter, is changed based on an exposure time for the second image capturing relating to the second image capturing parameter, for acquiring the plurality of the first captured images.

16. A method of controlling an image capturing apparatus including an image capturing unit and configured to output, in response to an image capturing instruction issued by a user while the image capturing unit sequentially outputs a plurality of first captured images captured by first image capturing using a first image capturing parameter, a second captured image captured by second image capturing using a second image capturing parameter based on the image capturing instruction, the method comprising:

setting the first image capturing parameter and the second image capturing parameter;

acquiring motion information based on the plurality of first captured images output from the image capturing unit; and estimating a motion blur of a subject in the second captured image captured by the second image capturing based on the motion information and the second image capturing parameter, wherein a frame rate, which is included in the first image capturing parameter, is changed based on an exposure time for the second image capturing relating to the second image capturing parameter, for acquiring the plurality of the first images.

17. A non-transitory computer-readable storage medium storing a program configured to cause a computer to execute step of method of controlling an information processing apparatus, the method comprising:

setting a first image capturing parameter and a second image capturing parameter;

acquiring a plurality of first captured images captured by first image capturing using the first image capturing parameter, and to acquire motion information about a subject in the plurality of first captured images; and estimating a motion blur of the subject in a second captured image captured by second image capturing based on the motion information and the second image capturing parameter, wherein a frame rate, which is included in the first image capturing parameter, is changed based on an exposure time for the second image capturing relating to the second image capturing parameter, for acquiring the plurality of the first captured images.

* * * * *